(12) United States Patent
Gilad-Bachrach et al.

(10) Patent No.: US 9,996,165 B2
(45) Date of Patent: *Jun. 12, 2018

(54) 3D GESTURE RECOGNITION

(71) Applicant: Microsoft Technology Licensing, LLC, Redmond, WA (US)

(72) Inventors: Ran Gilad-Bachrach, Bellevue, WA (US); Dimitrios Lymberopoulos, Redmond, WA (US); Gerald Reuben Dejean, II, Houston, TX (US); Eden Alejandro Alanis Reyes, Monterrey (MX); Trang T. Thai, Albany, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/372,939

(22) Filed: Dec. 8, 2016

(65) Prior Publication Data

US 2017/0090591 A1    Mar. 30, 2017

Related U.S. Application Data

(63) Continuation of application No. 14/329,875, filed on Jul. 11, 2014, now Pat. No. 9,552,069.

(51) Int. Cl.
*G06F 3/01*    (2006.01)
*G06K 9/00*    (2006.01)
(Continued)

(52) U.S. Cl.
CPC .............. *G06F 3/017* (2013.01); *G06F 3/041* (2013.01); *G06F 3/046* (2013.01); *G06F 3/0416* (2013.01);
(Continued)

(58) Field of Classification Search
CPC ........ G06F 3/017; G06F 3/041; G06F 3/0416; G06F 3/046; G06F 2203/04101;
(Continued)

(56) References Cited

U.S. PATENT DOCUMENTS 4,701,727 A    10/1987  Wong
5,781,081 A    7/1998   Arakawa et al.
(Continued)

FOREIGN PATENT DOCUMENTS

EP        2587347 A2    5/2013

OTHER PUBLICATIONS

U.S. Appl. No. 61/498,417 titled "Proximity Sensor", filed Jun. 17, 2011 by Inventors Gerald DeJean and Trang Thai, 24 pages.
(Continued)

*Primary Examiner* — Tom Sheng
(74) *Attorney, Agent, or Firm* — Rainier Patents, P.S.

(57) ABSTRACT

The description relates to 3D gesture recognition. One example gesture recognition system can include a gesture detection assembly. The gesture detection assembly can include a sensor cell array and a controller that can send signals at different frequencies to individual sensor cells of the sensor cell array. The example gesture recognition system can also include a gesture recognition component that can determine parameters of an object proximate the sensor cell array from responses of the individual sensor cells to the signals at the different frequencies, and can identify a gesture performed by the object using the parameters.

20 Claims, 11 Drawing Sheets

(51) Int. Cl.
*G06F 3/041* (2006.01)
*G06F 3/046* (2006.01)
(52) U.S. Cl.
CPC ..... *G06K 9/00201* (2013.01); *G06K 9/00335* (2013.01); *G06F 2203/04101* (2013.01); *G06F 2203/04108* (2013.01)
(58) Field of Classification Search
CPC . G06F 2203/04103; G06F 2203/04104; G06F 2203/04108; G06K 9/00201; G06K 9/00335
See application file for complete search history.

(56) References Cited

U.S. PATENT DOCUMENTS

| | | | |
|---|---|---|---|
| 5,801,340 | A | 9/1998 | Peter |
| 5,986,549 | A | 11/1999 | Teodorescu |
| 6,094,981 | A | 8/2000 | Hochstein |
| 6,583,676 | B2 | 6/2003 | Krah et al. |
| 6,650,111 | B2 | 11/2003 | Christensen |
| 6,742,324 | B2 | 6/2004 | Bachelder et al. |
| 6,770,901 | B1 | 8/2004 | Ogawa et al. |
| 6,834,251 | B1 | 12/2004 | Fletcher |
| 7,031,886 | B1 | 4/2006 | Hargreaves |
| 7,064,631 | B2 | 6/2006 | Shih |
| 7,170,085 | B2 | 1/2007 | Raspopin et al. |
| 7,394,346 | B2* | 7/2008 | Bodin ............... G06F 3/017 340/10.1 |
| 7,545,365 | B2 | 6/2009 | Kent et al. |
| 7,777,478 | B2 | 8/2010 | Dai et al. |
| 8,226,237 | B2 | 7/2012 | Mandelstam-Manor et al. |
| 8,547,118 | B1* | 10/2013 | Vojjala ............... G06F 3/0416 324/667 |
| 8,571,472 | B2 | 10/2013 | Lin et al. |
| 8,577,289 | B2 | 11/2013 | Schlub et al. |
| 8,711,112 | B2 | 4/2014 | Suzuki |
| 8,760,242 | B2 | 6/2014 | Tamaru et al. |
| 8,766,657 | B2 | 7/2014 | DeJean et al. |
| 8,917,262 | B2 | 12/2014 | Liaw et al. |
| 8,982,051 | B2* | 3/2015 | Rosenfeld ........... G06F 3/03543 345/163 |
| 9,092,100 | B2* | 7/2015 | Coni ............... G06F 3/0416 |
| 9,552,069 | B2* | 1/2017 | Gilad-Bachrach ...... G06F 3/017 |
| 9,582,080 | B1* | 2/2017 | Tilton ............... G06F 3/017 |
| 2005/0185679 | A1 | 8/2005 | Sangawa et al. |
| 2007/0241839 | A1 | 10/2007 | Taniguchi |
| 2007/0252485 | A1 | 11/2007 | Kawakubo et al. |
| 2009/0189867 | A1 | 7/2009 | Krah et al. |
| 2009/0273571 | A1* | 11/2009 | Bowens ............. G06F 3/03547 345/173 |
| 2010/0085325 | A1 | 4/2010 | King-Smith et al. |
| 2010/0242274 | A1 | 9/2010 | Rosenfeld et al. |
| 2010/0253319 | A1* | 10/2010 | Cehelnik ............ G06F 3/017 324/72 |
| 2010/0328259 | A1 | 12/2010 | Ishizaki et al. |
| 2011/0007030 | A1 | 1/2011 | Mo et al. |
| 2011/0022351 | A1 | 1/2011 | Philipp et al. |
| 2011/0042152 | A1 | 2/2011 | Wu |
| 2011/0063224 | A1 | 3/2011 | Vexo et al. |
| 2011/0069023 | A1 | 3/2011 | Kwak |
| 2011/0148813 | A1 | 6/2011 | Araki |
| 2011/0175671 | A1 | 7/2011 | Reynolds |
| 2011/0199333 | A1 | 8/2011 | Philipp et al. |
| 2011/0279397 | A1 | 11/2011 | Rimon et al. |
| 2011/0291988 | A1* | 12/2011 | Bamji ............... G06F 3/0428 345/175 |
| 2011/0310059 | A1 | 12/2011 | Miyamoto et al. |
| 2011/0312279 | A1 | 12/2011 | Tsai et al. |
| 2012/0038583 | A1 | 2/2012 | Westhues et al. |
| 2012/0073390 | A1 | 3/2012 | Zaghloul et al. |
| 2012/0105362 | A1 | 5/2012 | Kremin et al. |
| 2012/0146943 | A1 | 6/2012 | Fairley et al. |
| 2012/0293404 | A1* | 11/2012 | Federico ............ G06F 3/0304 345/156 |
| 2012/0313882 | A1 | 12/2012 | Aubauer et al. |
| 2014/0027606 | A1 | 1/2014 | Raynor et al. |
| 2014/0240164 | A1 | 8/2014 | DeJean et al. |
| 2015/0227180 | A1* | 8/2015 | Rabii ............... G06F 1/26 713/323 |
| 2016/0011668 | A1 | 1/2016 | Gilad-Bachrach et al. |
| 2016/0054853 | A1* | 2/2016 | Hu ............... G06F 3/0412 345/174 |

OTHER PUBLICATIONS

Restriction Requirement dated Oct. 18, 2013 from U.S. Appl. No. 13/214,025, 5 pages.
Response dated Nov. 4, 2013 to the Restriction Requirement dated Oct. 18, 2013 from U.S. Appl. No. 13/214,025, 7 pages.
Non-Final Office Action dated Nov. 21, 2013 from U.S. Appl. No. 13/214,025, 20 pages.
Response dated Dec. 2, 2013 to the Non-Final Office Action dated Nov. 21, 2013 from U.S. Appl. No. 13/214,025, 10 pages.
Supplemental Amendment dated Jan. 30, 2014 to the Response dated Dec. 2, 2013 from U.S. Appl. No. 13/214,025, 7 pages.
Notice of Allowance dated Feb. 14, 2014 from U.S. Appl. No. 13/214,025, 12 pages.
Restriction Requirement dated Oct. 21, 2016 from U.S. Appl. No. 14/261,300, 6 pages.
Response dated Oct. 26, 2016 to the Restriction Requirement dated Oct. 21, 2016 from U.S. Appl. No. 14/261,300, 7 pages.
Non-Final Office Action dated Sep. 17, 2015 from U.S. Appl. No. 14/329,875, 18 pages.
Response dated Dec. 31, 2015 to the Non-Final Office Action dated Sep. 17, 2015 from U.S. Appl. No. 14/329,875, 11 pages.
Non-Final Office Action dated Mar. 17, 2016 from U.S. Appl. No. 14/329,875, 17 pages.
Response dated Jul. 5, 2016 to the Non-Final Office Action dated Mar. 17, 2016 from U.S. Appl. No. 14/329,875, 10 pages.
Notice of Allowance dated Sep. 13, 2016 from U.S. Appl. No. 14/329,875, 12 pages.
Corrected Notice of Allowability dated Dec. 22, 2016 from U.S. Appl. No. 14/329,875, 9 pages.
International Search Report and Written Opinion dated Nov. 2, 2015 from PCT Patent Application No. PCT/US2015/039279, 11 pages.
International Preliminary Report on Patentability dated Jan. 17, 2017 from PCT Patent Application No. PCT/US2015/039279, 8 pages.
"LeapMotion", retrieved on Feb. 21, 2014, available at <<https://www.leapmotion.com/>>, 5 pages.
"Linear-Technology Dual/Quad Rail-to-Rail Input and Output Precision Op Amps LT1632", retrieved on Feb. 21, 2014, available at <<http://www.linear.com/product/LT1632>>, 2 pages.
"Linear-Technology RMS Power Detector with 57dB Dynamic Range LTC5582", retrieved on Feb. 21, 2014, available at <<http://www.linear.com/product/LTC5582>>, 2 pages.
"Microsoft Kinect", retrieved on Feb. 21, 2014, available at <<http://www.xbox.com/en-US/kinect>>, 3 pages.
"RFVC1802 Wideband MMIC VCO with Buffer Amplifier", retrieved on Feb. 21, 2014, available at <<http://www.rfmd.com/CS/Documents/RFVC1802DS.pdf>>, 6 pages.
Aezinia et al., "Touchless Capacitive Sensor for Hand Gesture Detection", IEEE Sensors, Oct. 28, 2011, 4 pages.
Balluff, Inc., "Inductive Proximity Sensors", retrieved on Feb. 21, 2014, available at <<http://www.balluff.com/balluff/MUS/en/products/Inductive-Sensors.jsp>>, 2 pages.
Bhuiya, Omar Faruqe, "Design and Optimization of a Stripline Resonator Sensor for Measurement of Rubber Thickness", Thesis, Dec. 2006, 67 pages.
Breiman, Leo, "Random Forests", Proceedings of Machine Learning, vol. 45, No. 1, Oct. 2001, pp. 5-32, 28 pages.
Butler et al., "SideSight: Multi-"Touch" Interaction around Small Devices", Proceedings of 21st Annual ACM Symposium on User Interface Software and Technology, Oct. 19-22, 2008, pp. 201-204, 4 pages.

(56) References Cited

OTHER PUBLICATIONS

Camacho et al., "Designing Touch Sensing Electrodes: Electrical Considerations and Recommended Layout Patterns", Free Semiconductor, Document No. AN3863, Rev. 4, Jul. 2011, 28 pages.
Carr et al., "Development of a Method to Determine Operator Location Using Electromagnetic Proximity Detection", IEEE International Workshop on Robotic and Sensors Environments, Oct. 15, 2010, 6 pages.
Chen et al., "A Study of Detecting Social Interaction with Sensors in a Nursing Home Environment", Proceedings of the International Conference on Computer Vision workshop on Human-Computer Interation, Oct. 15-16, 2005, 12 pages.
Chiang et al., "A Semicylindrical Capacitive Sensor with Interface Circuit Used for Flow Rate Measurement", IEEE Sensors Journal, vol. 6, No. 6, Dec. 2006, pp. 1564-1570, 7 pages.
Cohn, Seymour B., "Parallel-Coupled Transmission-Line-Resonator Filters", IRE Transactions on Microwave Theory and Techniques, vol. 6, Issue 2, Apr. 1958, pp. 223-231, 9 pages.
Hall et al., "The WEKA Data Mining Software: An Update", Proceedings of ACM SIGKDD Explorations Newsletter, vol. 11, Issue 1, Jun. 2009, 9 pages.
Hittite Microwave Corporation, "SP8T Positive Control Switch SMT HMC321LP4", retrieved on Feb. 21, 2014, available at <<http://www.hittite.com/products/view.html/view/HMC321LP4>>, 2 pages.
Hittite Microwave Corporation, "SP4T Positive Control Switch SMT HMC345LP3", retrieved on Feb. 21, 2014, available at <<http://www.hittite.com/products/view.html/view/HMC345LP3>>, 2 pages.
Koibuchi et al., "Loss Estimation and Sensing Property Enhancement for Eddy-Current-Type Proximity Sensor", IEEE Transactions on Magnetics, vol. 42, No. 4, Apr. 2006, pp. 1447-1450, 4 pages.
Osoinach, Bryce, "Proximity Capacitive Sensor Technology for Touch Sensing Applications", Proximity Sensing White Paper, retrieved on Feb. 21, 2014, 12 pages.
Pavlovic et al., "Visual Interpretation of Hand Gestures for Human-Computer Interaction: A Review", IEEE Transactions on Pattern Analysis and Machine Intelligence, vol. 19, No. 7, Jul. 1997, pp. 677-695, 19 pages.
Pepperl et al., "Proximity Sensors", retrieved on Feb. 21, 2014, available at <<http://www.pepperl-fuchs.com/global/en/classid_142.htm>>, 2 pages.
Rekimoto, Jun, "SmartSkin: An Infrastructure for Freehand Manipulation on Interactive Surfaces", CHI 2002, Apr. 20-25, 2002, 8 pages.
Sato et al., "Touche: Enhancing Touch Interaction on Humans, Screens, Liquids, and Everyday Objects", Proceedings of the SIGCHI Conference on Human Factors in Computing Systems, May 5-10, 2012, 10 pages.
Texas Instruments, "Low Power CPU MSP430f47187 User's Guide", Published on Apr. 2013, available at <<http://www.ti.com/lit/ug/slau056I/slau056I.pdf>>, 946 pages.
Tsuji et al., "A Multifunction Tactile and Proximity Sensing Method by Optical and Electrical Simultaneous Measurement", IEEE Transactions on Instrumentation and Measurement, vol. 61, No. 12, Dec. 2012, pp. 3312-3317, 6 pages.
Vennard, Martin, "Leon Theremin: The man and the music machine", BBC News Magazine, Mar. 13, 2012, 3 pages.
Zimmerman et al., "Applying Electric Field Sensing to Human-Computer Interfaces", Proceedings of the SIGCHI Conference on Human Factors in Computing Systems, May 7-11, 1995, pp. 280-287, 8 pages.
Non-Final Office Action dated Jan. 23, 2017 from U.S. Appl. No. 14/261,300, 9 pages.
Response dated Mar. 9, 2017 to the Non-Final Office Action dated Jan. 23, 2017 from U.S. Appl. No. 14/261,300, 7 pages.
Notice of Allowance dated Jun. 14, 2017 from U.S. Appl. No. 14/261,300, 11 pages.
Corrected Notice of Allowability dated Jun. 30, 2017 from U.S. Appl. No. 14/261,300, 8 pages.
Amended Claims filed Sep. 1, 2017 from Chinese Patent Application No. 201580037987.6, 12 pages.
Communication pursuant to Rules 161(1) and 162 EPC dated Feb. 17, 2017 from European Patent Application No. 15747268.9, 2 pages.
Response filed Mar. 22, 2017 to the Communication pursuant to Rules 161(1) and 162 EPC dated Feb. 17, 2017 from European Patent Application No. 15747268.9, 10 pages.

\* cited by examiner

3D GESTURE RECOGNITION

BACKGROUND

Human interaction with touch-enabled devices is generally constrained to the surface of these devices through touch sensors. However, the size range of computing devices, ranging from tiny wearable devices (e.g., smart watches) to huge displays, can limit the touch sensor as the primary input medium. In the case of small screens, touching the screen can be inherently problematic as human fingers can cover a portion of the screen, obstructing visibility of the display. On the other hand, interacting with touch sensors on large displays can be cumbersome. In some cases, it may be advantageous to be able to detect a user gesture without relying on touch sensors.

SUMMARY

The description relates to 3D gesture recognition. One example gesture recognition system can include a gesture detection assembly. The gesture detection assembly can include a sensor cell array and a controller that can send signals at different frequencies to individual sensor cells of the sensor cell array. The example gesture recognition system can also include a gesture recognition component that can determine parameters of an object proximate the sensor cell array from responses of the individual sensor cells to the signals at the different frequencies, and can identify a gesture performed by the object using the parameters.

The above listed example is intended to provide a quick reference to aid the reader and is not intended to define the scope of the concepts described herein.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. In some cases parentheticals are utilized after a reference number to distinguish like elements. Use of the reference number without the associated parenthetical is generic to the element. Further, the left-most numeral of each reference number conveys the FIG. and associated discussion where the reference number is first introduced.

DETAILED DESCRIPTION

Overview

This description relates to real-time, three-dimensional (3D) gesture recognition. The present concepts offer a novel approach to touchless interaction with digital displays. In some implementations, a two-dimensional (2D) array of radio frequency (RF) sensor cells can be used to detect the proximity of an object (e.g., a human body part). By monitoring changes in a frequency response from different sensor cells in the sensor cell array over time, an object near the sensor cell array can be tracked in three dimensions, enabling gesture recognition (e.g., gesture identification). By reducing a number of frequencies selected for distance and position classification, accurate real-time 3D gesture recognition can be performed with fewer resources. The RF sensor cell array can work without line-of-sight, can be embedded behind any type of surface, can be scaled, and/or can have relatively low power consumption compared to other proximity-sensing technologies.

In some implementations, a 3D gesture recognition system can include a 3D gesture detection assembly and a gesture recognition component. The 3D gesture detection assembly can include the 2D array of RF sensor cells mentioned above. Individual sensor cells in the RF sensor cell array can act as near-field RF proximity sensors to detect the proximity of an object. The detected proximity of the object can be analyzed by the gesture recognition component and identified (e.g., recognized) as a gesture.

Generally, when an object comes in close proximity to an individual sensor cell of the sensor cell array, the proximity of the object can slightly disturb a frequency response of the individual sensor cell, allowing detection of the object. By combining multiple sensor cells into the 2D sensor cell array, the high resolution, RF-based, 3D gesture detection assembly can track objects over space and time. The gesture recognition component can use information sensed by the 3D gesture detection assembly to identify gestures.

First Example RF-Based 3D Gesture Detection Assembly

Figure 1:
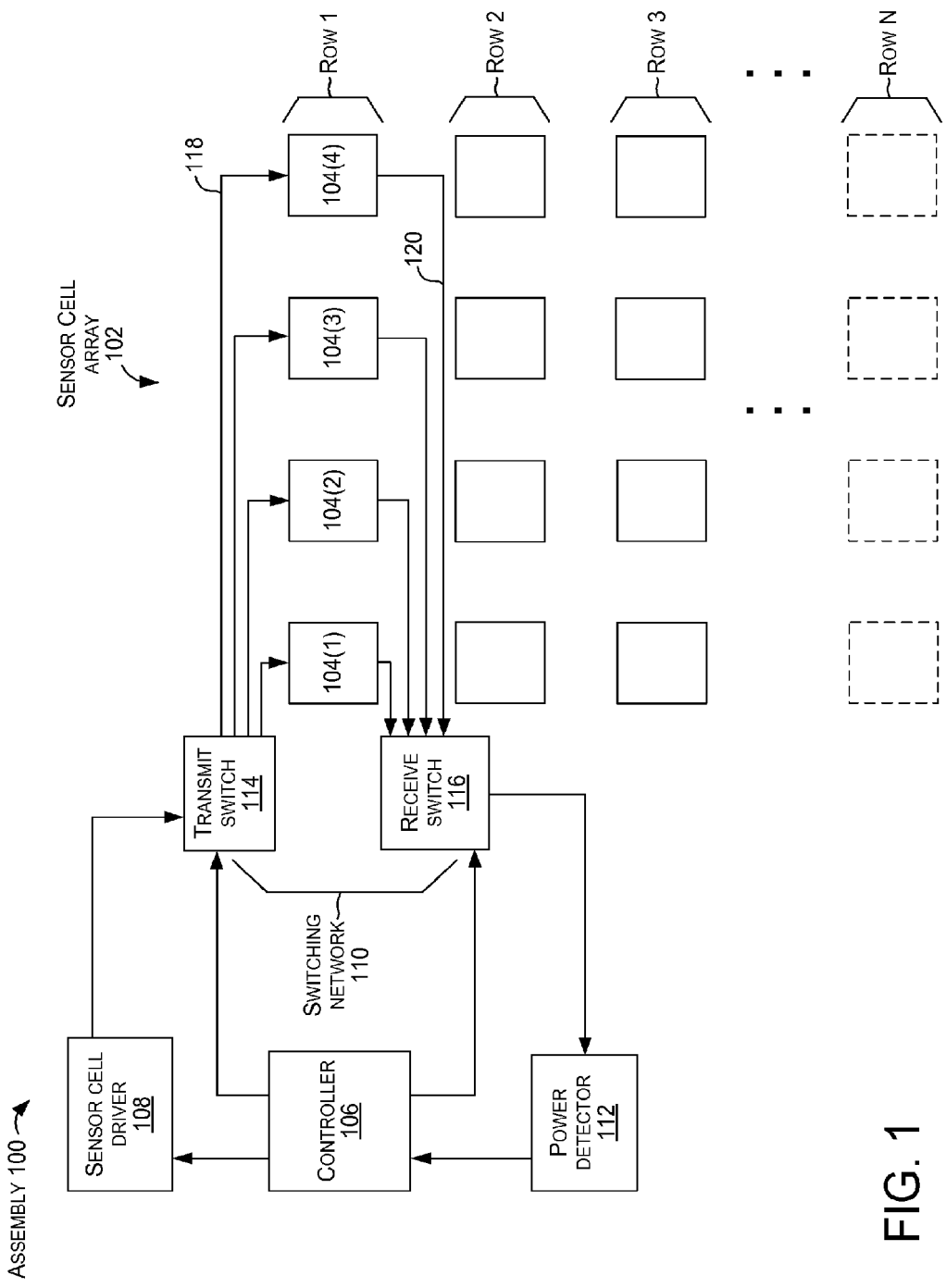
FIGS. 1-4 collectively illustrate example 3D gesture detection assemblies consistent with some implementations of the present concepts.
Figure 2:
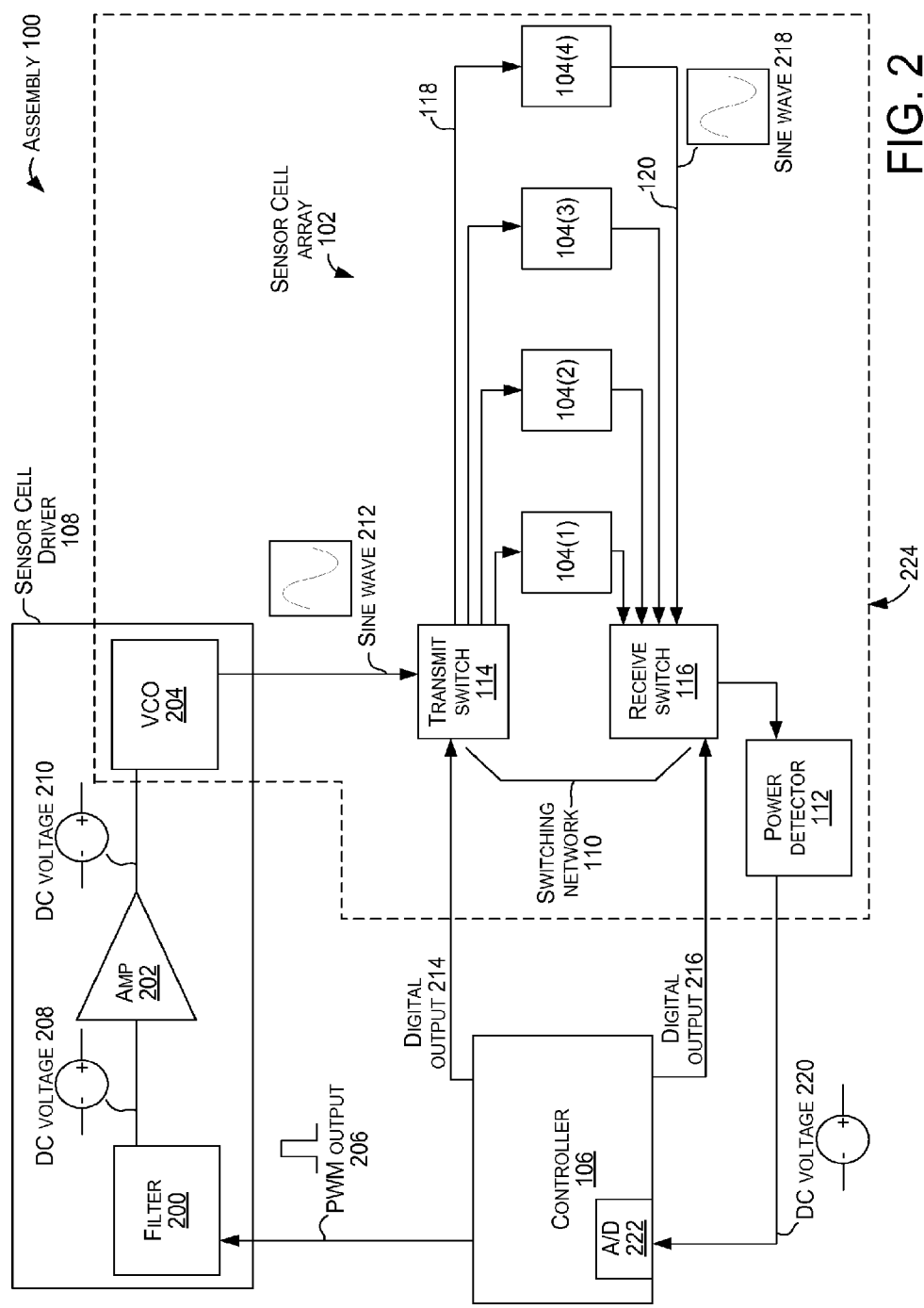

FIGS. 1-2 collectively illustrate a first example RF-based 3D gesture detection assembly 100. FIG. 1 is a schematic diagram of example RF-based 3D gesture detection assembly 100. In this example, the assembly 100 includes a sensor cell array 102. The sensor cell array 102 can entail multiple individual sensor cells 104. The assembly can also include a controller 106, a sensor cell driver 108, a switching network 110, and/or a power detector 112, among others.

As shown in FIG. 1, the sensor cells 104 can be arranged in rows in a rectilinear grid. In this example, Row 1 includes sensor cells 104(1), 104(2), 104(3), and 104(4). In some implementations, the sensor cell array 102 can include additional rows of sensor cells 104, as indicated at Row 2, Row 3, and Row N. Alternatively or additionally, in some implementations the sensor cell array 102 can include more or less columns of sensor cells 104. Other arrangements and/or groupings of sensor cells are contemplated, including non-linear, multidirectional, and/or 3D arrangements.

In the example shown in FIG. 1, the controller 106 is connected to the sensor cell driver 108. In some cases, the controller 106 can direct the sensor cell driver 108 to send a signal to the sensor cell array 102. As shown in the example in FIG. 1, the switching network 110 includes a transmit switch 114 and a receive switch 116. The switching network 110 can also include lines 118 from the transmit switch 114 to the individual sensor cells 104 and lines 120 from individual sensor cells 104 to the receive switch 116 (only one each of lines 118 and 120 are designated to avoid clutter on the drawing page). In this case, the switching network 110 can connect the sensor cell driver 108 to the sensor cell array 102 through the transmit switch 114. In some cases, the controller 106 can control the transmit switch 114 to determine which individual sensor cell 104 receives the signal from the sensor cell driver 108. The controller 106 can also control the receive switch 116 to pass a frequency response from an individual sensor cell 104 to the power detector 112. In some cases, the power detector 112 can generate a power reading from the frequency response, and the power detector 112 can send the power reading to the controller 106.

FIG. 2 is an expanded schematic diagram of first example RF-based 3D gesture detection assembly 100. In this case, sensor cell Row 2, Row 3, and Row N are not shown to avoid clutter on the drawing page. In FIG. 2, an expanded view of the sensor cell driver 108 is provided to show internal components of the sensor cell driver 108. In this example, the sensor cell driver 108 includes a filter 200 (e.g., low pass filter, RC circuit), an amplifier 202 (e.g., amp) and a voltage controlled oscillator (VCO) 204 (e.g., VCO chip).

An example operation of RF-based 3D gesture detection assembly 100 will now be described relative to FIG. 2. In some implementations, a pulse width modulation (PWM) output 206 can be sent from controller 106 to sensor cell driver 108. In some implementations, the controller 106 can be a relatively low-power and/or relatively low-frequency controller. The PWM output can be a square pulse with an adjustable duty cycle. By varying the duty cycle, the level of DC voltage 208 can be varied at the output of the RC filter 200. Amplifier 202 can be used to raise the voltage level from DC voltage 208 to DC voltage 210. In this case, DC voltage 210 can be within the input voltage range of the VCO 204. Using the input of DC voltage 210, the VCO 204 can generate sine wave 212.

Controller 106 can also direct the switching network 110. The controller 106 can select an individual sensor cell 104 via digital outputs 214 and 216. The digital outputs 214 and 216 can be sent to transmit switch 114 and receive switch 116. In the example in FIG. 2, the sine wave 212 is sent through the transmit switch 114 to individual sensor cell 104(4) via line 118. In response, the sensor cell 104(4) can output sine wave 218 at line 120. The receive switch 116 can direct sine wave 218 to the power detector 112. In some cases, a frequency shift between sine wave 212 and sine wave 218 can represent a frequency response caused by proximity of an object to a sensor cell 104, such as a human finger over sensor cell 104(4). Additionally, the magnitude of the shift can suggest a distance of the object to the sensor cell 104. The power detector 112 can convert sine wave 218 into DC voltage 220. The DC voltage 220 can then be sampled by A/D converter 222, which can be embedded on the controller 106.

In this case, the controller 106 can direct the switching network 110 to multiplex the individual sensor cells 104. In this manner, sine wave 212 can be sent sequentially to the individual sensor cells 104. Multiple frequency responses from the individual sensor cells 104 can be analyzed for proximity of an object. In some cases, analysis of the multiple frequency responses can provide identification of a 3D gesture.

In some implementations, the input voltage range of the VCO 204 can be such that the sine wave 212 is a high frequency (e.g., RF) sine wave (such as 6-8 GHz). In these implementations, a portion of the components and connectors of the RF-based 3D gesture detection assembly 100 will be high frequency components and connectors. For example, as shown in FIG. 2, the dashed line area 224 can represent high frequency components and connectors. Components and connectors outside the dashed line area 224 can be considered low frequency and/or control components. In this case, a low frequency controller 106, RC filter 200, and amplifier 202 are set up such that the VCO 204 can generate a high frequency sine wave 212.

To summarize, high frequency sine wave signals can be generated at a relatively low cost and relatively low power by leveraging a controller, an RC filter, an amplifier, and a VCO. Additionally, a switching network can be used to multiplex a sensor cell array. Proximity of an object can be detected by a frequency response detected at an individual sensor cell of the sensor cell array. Multiple detected frequency responses can be identified as a 3D gesture.

Second Example RF-Based 3D Gesture Detection Assembly

Figure 3:
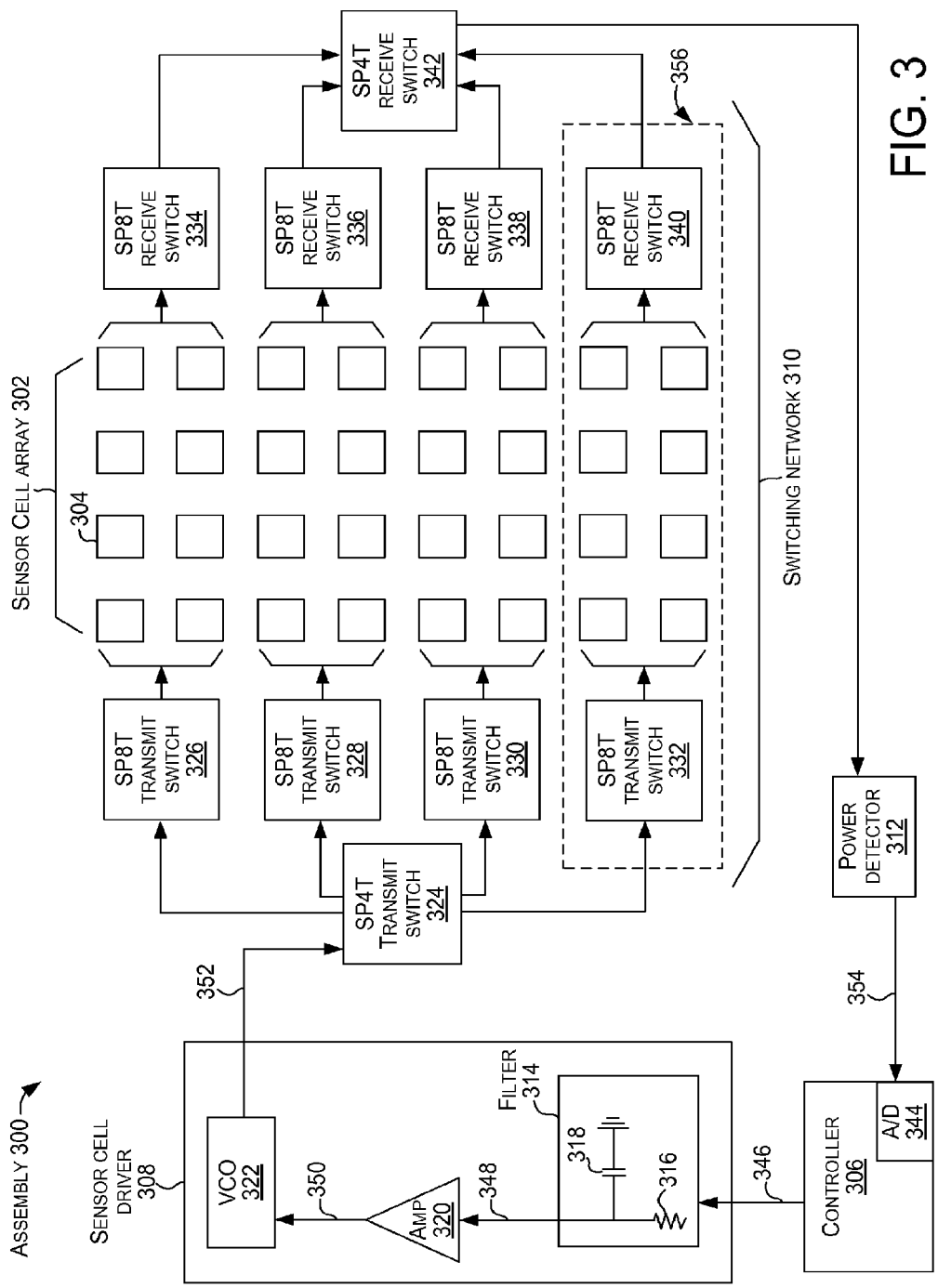
Figure 4:
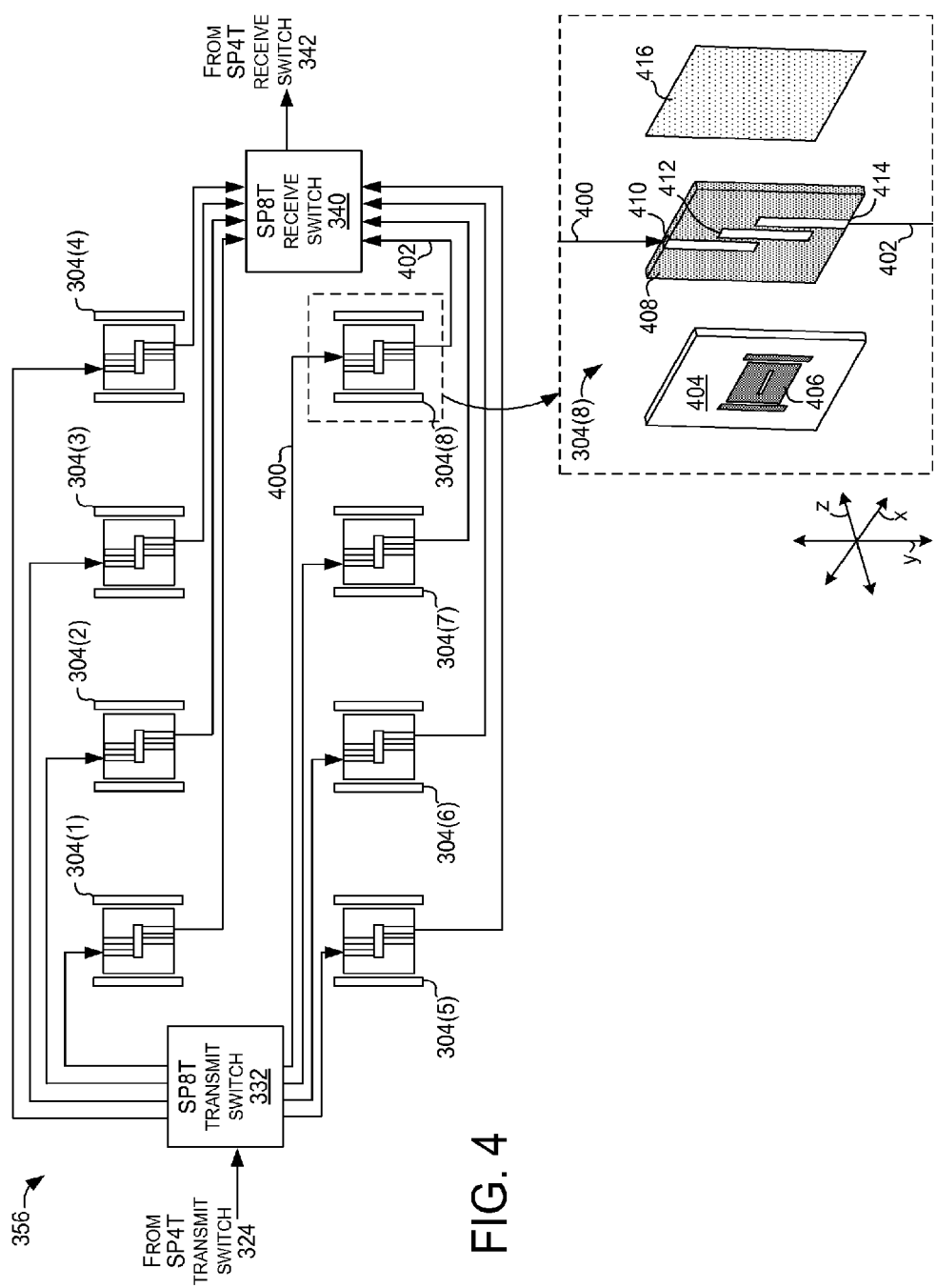

FIGS. 3-4 collectively illustrate a second example RF-based 3D gesture detection assembly 300. FIG. 3 is a schematic diagram of example RF-based 3D gesture detection assembly 300. In this example, the assembly 300 includes a sensor cell array 302 (sensor cell array 302 can be similar to sensor cell array 102 described relative to FIG. 1). The sensor cell array 302 can entail multiple individual sensor cells 304 (only one sensor cell 304 is designated to avoid clutter on the drawing page). In this case, 32 individual sensor cells 304 are arranged in four columns and eight rows (shown but not designated). The assembly 300 can also include a controller 306, a sensor cell driver 308, a switching network 310, and/or a power detector 312 (similar to the corresponding elements of FIG. 1), among others.

In this example, sensor cell driver 308 can include a filter 314 (e.g., low pass filter, RC circuit), which can include a resistor 316 and a capacitor 318. The sensor cell driver 308 can also include an amplifier 320 and a voltage controlled oscillator (VCO) 322.

In the example shown in FIG. 3 the switching network 310 includes two layers of transmit switches and two layers of receive switches on a circuit board. In some cases, a layered switching network can be used to reduce and potentially minimize the number of RF lines on the circuit board, which can decrease potential cross coupling of signals and reduce power consumption. In other implementations the sensor cell array can have more or less individual sensor cells than the example shown in FIG. 3. In these cases, there can be more or less switches, layers of switches, and/or lines on a circuit board to support the sensor cell array.

In the example in FIG. 3, signals from sensor cell driver 308 can be directed to a gallium arsenide, metal-semiconductor field effect transistor (GaAs MESFET) single-pole, four-throw (SP4T) transmit switch 324. In turn, the signal can be directed from SP4T transmit switch 324 to one of four GaAs MESFET single-pole, eight-throw (SP8T) transmit switches 326, 328, 330, and 332. Furthermore, the signal can be directed to any of eight individual sensor cells 304 from the SP8T transmit switches 326, 328, 330, and 332. After passing through an individual sensor cell 304, the signal can proceed to a corresponding GaAs MESFET SP8T receive switch 334, 336, 338, or 340. The signal can then pass through a GaAs MESFET SP4T receive switch 342 and proceed to the power detector 312 and then A/D converter 344, which can be embedded in controller 306. Other materials and/or specifications for the transmit and receive switches are contemplated.

In some implementations, the assembly 300 can have multiple RF lines and DC control lines to control the switches, and DC bias lines to power the switches. All of these lines can have impedances of 50-ohms, for example. Most of these lines are not shown in FIG. 3 to avoid clutter on the drawing page. Lines 346, 348, 350, 352, and 354 will be used to describe the operation of RF-based 3D gesture detection assembly 300 relative to FIGS. 3 and 4, below.

FIG. 4 is a schematic diagram that provides an expanded view of the dashed line box area 356 of FIG. 3.

FIG. 4 illustrates the connecting lines between SP8T transmit switch 332, eight individual sensor cells 304(1-8), and SP8T receive switch 340. Only two individual connecting lines 400 and 402 are designated to avoid clutter on the drawing page. FIG. 4 also shows an exploded view of individual sensor cell 304(8).

In some implementations, the connecting lines of the SP8T switches (e.g., 326, 328, 330, and 332) can be RF lines that are voltage-controlled by a 3-to-8 decoder. In the example shown in FIG. 4, SP8T transmit switch 332 can contain one single-pole RF line (connected to SP4T transmit switch 324), eight RF throw lines (connected to sensor cells 304(1-8), including line 400), three voltage-controlled lines to control the eight RF throw lines (not shown), and a DC bias line (not shown). The RF lines of the SP8T transmit switch can be bidirectional. Therefore, for the SP8T transmit switch 332, the single-pole RF line can operate as an input line, and the eight RF throw lines can serve as output lines. When referring to SP8T receive switch 340, this operation can be reversed.

Similarly, referring to FIG. 3, the single-pole RF lines of the SP8T transmit switches 326, 328, 330, and 332 can be connected to a throw line of the SP4T transmit switch 324. The RF lines of the SP4T transmit switch 324 can be voltage-controlled by a 2-to-4 decoder. The SP4T transmit switch 324 can contain one single-pole RF line 352; four RF throw lines connected to SP8T transmit switches 326, 328, 330, and 332; two voltage-controlled lines (not shown) to control the four RF throw lines; and a DC bias line (not shown). The RF lines of the SP4T transmit switch 324 can also be bidirectional. Therefore, for the SP4T transmit switch 324, the single-pole RF line 352 can operate as an input line, and the four RF throw lines can serve as output lines. When referring to SP4T receive switch 342, this operation can be reversed.

In some implementations, the RF-based 3D gesture detection assembly 300 can be designed onto a single multilayer circuit board. In one example, all of the DC lines (bias line and control lines) can be on a backside of the multilayer circuit board, which can help preserve isolation between RF and DC signals.

As shown in the exploded view of individual sensor cell 304(8) in FIG. 4, the sensor cell 304(8) can include three layers. A top layer 404 can include a resonator patch 406. A middle layer can be a two-port, half-wavelength coupled bandpass filter 408. The bandpass filter 408 can have three separate conductive strips, including an input port 410, a middle strip 412, and an output port 414. The input port 410 can be connected to line 400, and the output port 414 can be connected to line 402. A bottom layer of the sensor cell can be a ground plane 416. In implementations where assembly 300 is designed onto a single multilayer circuit board, the ground plane 416 and the bandpass filter 408 can exist on the same layer in a coplanar waveguide configuration. These implementations can allow the use of only two substrate boards in the multilayer circuit board. In one case, the top layer 404 can have a thickness of 1.6 mm. Additionally, the sensor cell 304(8) can entail passive distributed printed components, so the sensor cell 304(8) itself is not a source of power consumption.

In some implementations, the operating frequency of an individual sensor cell 304 can correspond to a size and/or a surface area of an object being detected (e.g., a human finger). For example, if a sensor cell 304 is larger than a finger's surface area, the finger may not significantly affect the interrogation zone of the sensor cell 304. Therefore, for reliable detection of proximity of the finger to the sensor cell 304, the size of the sensor cell 304 can be similar to the surface area of an average human finger. In the example in FIG. 4, the resonator patch 406 of individual sensor cell 304(8) can have a length of 15 mm and a width of 15 mm. In some cases, the length of the middle strip 412 can be a half-wavelength long, which can determine the operating frequency of the bandpass filter 408. In some implementations, the longer the middle strip 412 is, the lower the operating frequency of the bandpass filter 408. Therefore, in cases where the size of the sensor cell 304 is similar to a human finger, the operating frequency of the sensor cell 304 can be relatively high frequency (e.g., RF), such as a range of 6-8 GHz.

In some implementations, a size of the sensor cell array 302 (FIG. 3) can be slightly larger than the size of a typical human hand. For example, in implementations where assembly 300 is designed onto a single multilayer circuit board, the circuit board can have a length of 210 mm and a width of 195 mm, among others. In one case, a separation distance between rows can be 6.5 mm, and a separation distance between columns can be 7.2 mm. Of course, other dimensions are considered for the circuit board and/or RF-based 3D gesture detection assembly or its component parts.

An example operation of RF-based 3D gesture detection assembly 300 will now be described relative to FIGS. 3 and 4. In some implementations, activation of the sensor cells 304 can generate frequency responses that can be analyzed for unique signatures, such as a gesture performed by a user. In some cases, activating the sensor cells 304 with multiple frequencies, as opposed to a single frequency, can provide a more detailed characterization of a signature. For example, the use of multiple frequencies can better elucidate finger placement of the user and/or distinction of gestures at multiple distances from the sensor cell 304. Therefore, the use of multiple frequencies can help enable identification of more complex 3D gestures. In order to activate the sensor cells 304 with multiple frequencies from the VCO 322, the assembly 300 can be configured to deliver multiple constant DC voltage levels to the VCO 322, as will be described below.

Referring to the example in FIG. 3, controller 306 can be a 16 MHz micro-controller (e.g., TI MSP430 CPU). In this example, the controller 306 can have a low power envelope, support the types of input and output utilized by assembly 300, and provide computing power for the operation of the assembly 300. At line 346 in FIG. 3, a pulse width modulation (PWM) output can be sent from the controller 306 to sensor cell driver 308. The PWM output can be a square pulse with an adjustable duty cycle. In this example, the controller 306 can have an operating voltage range of 0-3.3 V. Therefore, the PWM output can generally be at 0 V or at 3.3 V.

By properly adjusting the duty cycle, the amount of time that the PWM output from the controller 306 is at 3.3 V can be controlled. While the PWM output is at 3.3 V, the capacitor 318 of the RC filter 314 can be charged to a non-zero voltage level. In some cases, while the PWM output is at 0 V, the output of the RC filter 314 at line 348 is not 0 V, but at the voltage level that the charged capacitor 318 is able to maintain. Note that as the capacitor 318 discharges over time, the output voltage of the RC filter 314 to line 348 can also decrease. However, as the PWM output oscillates between 0 V and 3.3 V, the capacitor 318 is automatically re-charged, being able to maintain a generally constant DC voltage at line 348, the output of the RC filter

314. Therefore, the level of the constant DC voltage level at line 348 can depend on the duty cycle of the PWM output at 346, generally between 0 V and 3.3 V in this case. For example, multiple constant voltages such as 1 V, 1.2 V, 1.4 V, etc., can be output from the RC filter 314 at line 348.

Also in this example, the PWM output from controller 306 can have a frequency of 124 KHz. In order to obtain desired voltage levels through the sensor cell driver 308, the duty cycle of the PWM output can be adjusted. In general, a higher duty cycle corresponds to a higher output voltage. In this example, the duty cycle of the PWM output can be controlled by an 8-bit register, and thus it can take 128 discrete values. Each of these 128 values corresponds to a different duty cycle, and therefore to a different output voltage that the VCO 322 eventually converts to a different frequency, as will be described below. In this manner, the frequency response of an individual sensor cell 304 can be recorded for 128 different frequencies.

In the example shown in FIG. 3, the DC voltage at 348 can proceed to amplifier 320. In some implementations, an input voltage range of the VCO 322 can be 7-9 V. In these implementations, the amplifier 320 can be used to raise the voltage level from the DC voltage at 348 to DC voltage at 350. In this case, the DC voltage at 350 can be 7-9 V, within the input voltage range of the VCO 322. With a DC voltage input of 7-9 V at 350, the VCO can generate a sine wave at 352. In this case, the sine wave at 352 can be relatively high frequency, such as 6-8 GHz. In this manner, the frequency of the sine wave can correspond to the operating frequency of the sensor cells 304. Note that alternatively or additionally, other devices can provide signals at desired frequencies to a sensor cell array. For instance, a frequency generating device can be coupled to the sensor cell array and digitally set at a desired output frequency. Use of these and other devices for generating signals at specific frequencies is contemplated for RF-based 3D gesture detection assemblies.

Controller 306 can configure switching network 310 to select an individual sensor cell 304 via digital outputs sent to transmit switches and receive switches. By activating only a single sensor cell 304 at a time, power consumption across the assembly 300 can be decreased. In the example in FIG. 3, the sine wave at 352 can be sent through SP4T transmit switch 324 to SP8T transmit switch 332, to individual sensor cell 304(8) via line 400 (see FIG. 4). In other instances, the sine wave can be directed to another individual sensor cell 304 through one of SP8T transmit switches 326-332.

Referring to the example shown in FIG. 4, the 6-8 GHz sine wave can be directed to individual sensor cell 304(8). In this example, the sine wave signal can excite current in the input port 410. The current can generate capacitive coupling between the input port 410 and the middle strip 412. In turn, capacitive coupling can be generated between the middle strip 412 and the output port 414. In some cases, the capacitive coupling of energy across the bandpass filter 408 can allow signals at frequencies within a certain band to be transmitted, while other signals outside of the certain band can be suppressed. As noted above, the length of the middle strip 412 can be a half-wavelength long, which can determine the frequency of operation for the bandpass filter 408 (e.g., 6-8 GHz).

In this example, energy from the bandpass filter 408 can couple to the resonator patch 406 which can be located above the bandpass filter 408. In some implementations the coupling of energy to the resonator patch 406 can have two effects. First, the resonator patch 406 can create a second bandpass response around 7.8 GHz. Second, the resonator patch 406 can radiate a small zone of electromagnetic fields (e.g., energy) above its surface. The zone of electromagnetic fields can establish a vertical sensing range for the sensor cell 304(8). In this example, placing an object above the sensor cell 304(8) can disturb the zone of electromagnetic fields. In some cases, objects that contain water can disturb the zone of electromagnetic fields. Water-containing objects can include a body part (e.g., a human finger) or inanimate objects (e.g., a wand or stylus that includes water molecules, etc.). The disturbance of electromagnetic fields can alter the frequency response of the sensor cell 304(8). The altered frequency response (e.g., frequency shift) can be identified as a spectral signature of vertical placement of the object above the sensor cell 304(8). Furthermore, by exciting the input port 410 with sine waves of different frequencies within the 6-8 GHz range, multiple frequency responses can be recorded to better characterize the distance (e.g., along the z-axis of the x-y-z reference axes), position (e.g., relative to the x-y plane of the x-y-z reference axes), and/or size of the object placed close to the sensor cell 304(8). In this example, the bandpass filter 408 can allow a relatively high amount of energy to be transmitted from the input port 410 to the output port 414, which can facilitate detection of a change in received power versus transmitted power.

The altered frequency response can be output from the sensor cell 304(8) at output port 414 to line 402 as an output sine wave. The output sine wave can pass through the SP8T receive switch 340, through the SP4T receive switch 342, and on to the power detector 312, in this case. The power detector 312 can convert the output sine wave into a DC voltage at line 354. The DC voltage can then be sampled by A/D converter 344, which can be embedded on the controller 306.

In some implementations, instead of a response from a signal passing through a sensor cell, a response can be a reflected signal from a sensor cell. For example, a measurement can be made of signals reflected from a terminated sensor cell. In this example, a switching network can send a signal to a sensor cell and receive a response from the sensor cell via the same line.

In some implementations, an RF-based 3D gesture detection assembly could be designed without a power detector. Alternative to the use of a power detector, a signal at the output of an individual sensor cell could be directly mixed with a signal at the input of the individual sensor cell at a given frequency. This could provide a DC voltage representing the transmission response of the individual sensor cell at the given frequency. Eliminating the power detector from the RF-based 3D gesture detection assembly could lower an overall power consumption of the assembly.

To summarize, in some implementations, a 3D gesture detection assembly can include an RF sensor cell array, a controller, a sensor cell driver, and a switching network. In one example, the controller can direct the sensor cell driver to supply a high frequency (e.g., 6-8 GHz) signal to the RF sensor cell array. The controller can direct the switching network to choose an individual sensor cell to receive the signal. Frequency responses from the individual sensor cells can be collected. In order to efficiently collect a range of frequency responses, the controller can select specific frequencies and direct the sensor cell driver to send signals at a first and then an additional selected frequency to the chosen sensor cells in the array. The collected range of frequency responses can be identified as a specific 3D gesture.

In some implementations, the individual sensor cells of the RF sensor cell array can be multiplexed at a high rate to reduce power and computational resource consumption of the 3D gesture detection assembly. For example, only one sensor cell can be activated at any given time with an input signal at a single frequency. Activating one sensor at a time can reduce instantaneous power used to drive input signals to the sensors. Additionally, activating one sensor at a time can reduce sensing frequency, and therefore reduce computational expense. To further improve efficiency, feature selection analysis can be used to select input signal frequencies that provide high gesture recognition rates.

RF sensor cell arrays can be scaled to smaller or larger devices. In some implementations, smaller or larger 3D gesture detection assemblies can be achieved by adding or removing RF sensor cells from the sensor cell array. Additionally, the effective range and/or sensitivity of the proximity sensing can be adjusted by changing the size of the individual sensor cells.

In general, the characteristics of RF sensor cells can be such that the RF sensor cell array can be embedded behind/under any type of surface while still enabling real-time gesture recognition. For example, a wide variety of materials may be used for screens, displays, protective coverings, etc., with a sensor cell array embedded behind the material. Surfaces or objects added between the RF sensor cell array and a detected object can be manifest as a constant shift in the frequency response of individual sensor cells in the sensor cell array, and therefore can be taken into account during calibration of the 3D gesture detection assembly.

Additionally, the RF sensor cell array can enable real-time gesture recognition without line-of-sight to the detected object. For example, a 3D gesture detection assembly and/or device in a user's pocket could detect an object outside of the user's pocket. For example, the user could put his phone in his pocket and perform a gesture with his hand outside the pocket. In this example, a gesture detection assembly embedded in the phone could detect the gesture through the fabric of the pocket.

In the case illustrated in FIG. 3, the sensor cell driver 308 can be considered a single source of signals supplying multiple individual sensor cells 304 through the switching network 310. In some implementations, a gesture detection assembly could include more than one signal source. For example, a gesture detection assembly could include two signal sources supplying signals with different frequency ranges to two sets of sensor cells. In this case, the two sets of sensor cells could have input frequency ranges which correspond to the respective signal sources. The multiple frequency ranges could allow a broader range for object detection and/or gesture recognition. Other variations of the number or specifications of components of the gesture detection assembly are contemplated.

RF-Based 3D Gesture Recognition Scenario Example

Figure 5:
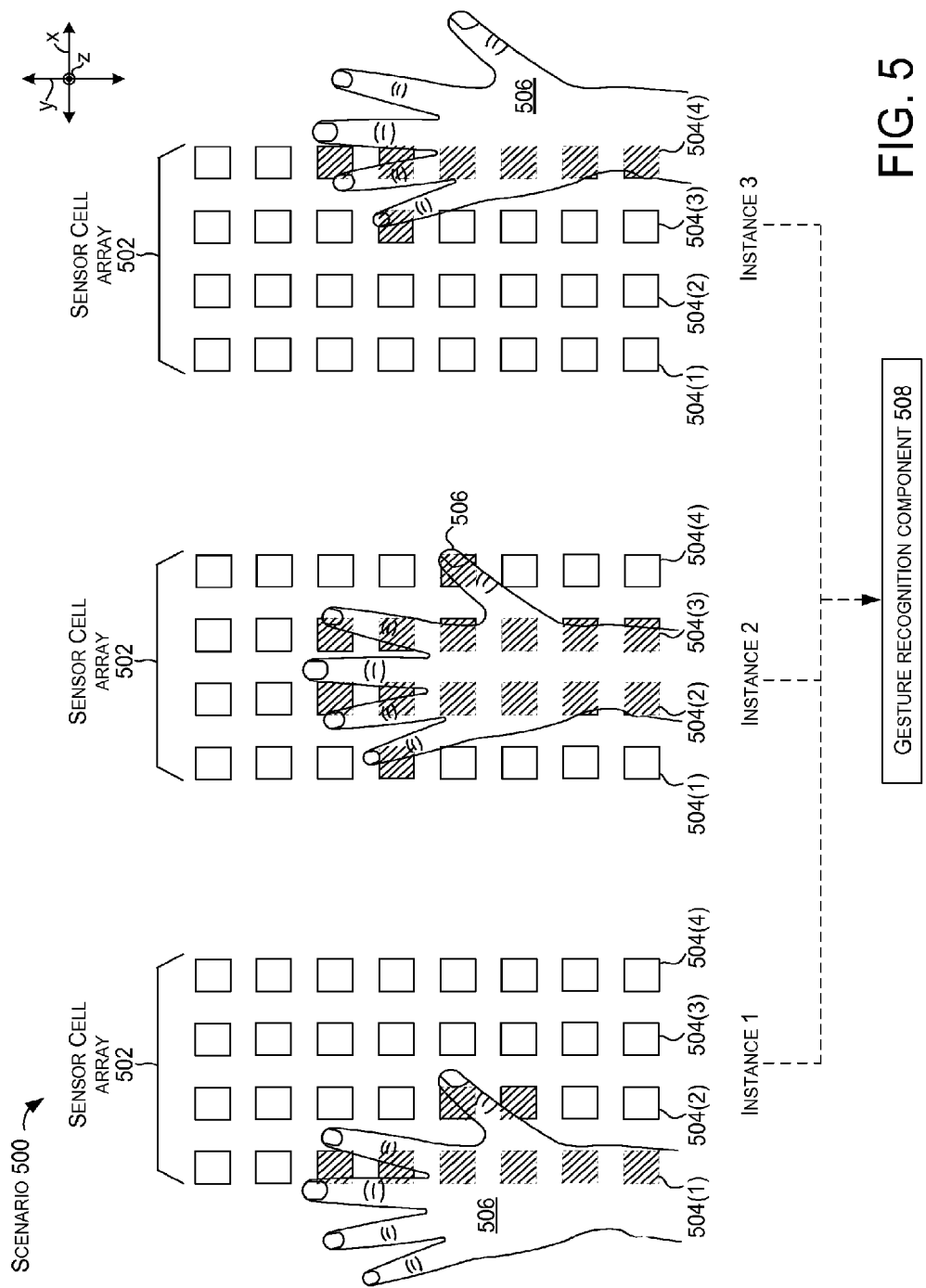
FIG. 5 illustrates an example 3D gesture recognition scenario consistent with some implementations of the present concepts.

FIG. 5 illustrates an example 3D gesture recognition scenario 500. In this example, a sensor cell array 502 can include multiple individual sensor cells 504. The sensor cell array 502 can be similar to the sensor cell array 102 described relative to FIG. 1 and/or the sensor cell array 302 described relative to FIG. 3. In some implementations, the sensor cell array 502 can be included on a RF-based 3D gesture detection assembly such as assembly 300, described above relative to FIGS. 3 and 4. In scenario 500, an object that is being detected is a hand of a user 506. In this case, the user 506 can interact with the sensor cell array 502. For example, the user 506 can perform a gesture represented by three Instances 1, 2, and 3. In this example, a gesture recognition component 508 can identify the gesture performed by the user 506.

In general, gesture identification by the gesture recognition component 508 can include the ability to sense an object and/or parameters of the object. Parameters can include an orientation of the object in 3D space, a profile (e.g., shape, outline) of the object, and/or movement of the object over a duration of time, among other parameters. In one example, the object can be a user's hand. As the user's hand hovers over a 3D gesture detection assembly, individual sensor cells can sense different parts of the hand, an orientation of the hand, a profile of the hand (e.g., a change in a position of one or more fingers), and/or other parameters. The gesture recognition component 508 can use some or all of the sensed parameters to identify a gesture or other input of the user.

The orientation of the object in 3D space can include a 2D position of the object relative to the sensor cell array and also a distance of the object from individual sensor cells. The three Instances in FIG. 5 show the user's hand changing position relative to the sensor cell array 502. In the example shown in FIG. 5, as the hand changes position with respect to the sensor cell array 502 by moving from left to right, along the x axis of the x-y-z reference axes, the frequency responses of different subsets of sensor cells 504 can change and/or be disturbed. Similarly, the hand can change position by moving from top to bottom of the sensor cell array 502, along the y axis. Tracking the disturbances for different hand positions can approximate tracking the hand in the 2D space of the surface of the sensor cell array 502.

In the example shown in FIG. 5, Instance 1 shows the hand of user 506 near the left side of the sensor cell array 502 along the x axis. Instance 2 shows the hand roughly near the center of the sensor cell array 502. Instance 3 shows the hand near the right side of the sensor cell array 502. In this case, as the user 506 swipes his hand from left to right across the sensor cell array 502, different individual sensor cells 504 can register a frequency shift caused by proximity of the hand, as represented with cross-hatching. In FIG. 5, only four sensor cells 504(1-4) are designated to avoid clutter on the drawing page. In Instance 1, sensor cell 504(1) (as well as other non-designated sensor cells 504) is registering a frequency shift. In Instance 2, sensor cells 504(2) and 504(3) are registering a frequency shift, and sensor cell 504(1) is no longer reading a frequency shift. In Instance 3, sensor cell 504(4) is registering a frequency shift. In this case, the gesture recognition component 508 can detect the hand from the output of the sensor cell array 502, identify the movement of the hand from left to right over the sensor cell array 502, and identify the movement of the object as a swipe gesture.

In the example illustrated in FIG. 5, positions and/or movement in two dimensions, parallel to the surface of the sensor cell array 502, are shown. Alternatively or additionally, the sensor cell array 502 can also be used to detect vertical movement in a third dimension. For example, the user 506 can also lift his hand away from or lower his hand down toward the surface of the sensor cell array 502, along the z axis of the x-y-z reference axes. In this example, as the hand moves along the z axis, a distance from the sensor cells 504 can change. The change in distance of the hand of user 506 from corresponding sensor cells 504 can also result in a change in the frequency response and/or a change in signal strength of these sensor cells 504. In general, a combination of a position and a distance of an object relative to the sensor cell array 502 can be considered a 3D orientation of the object relative to the sensor cell array 502.

As noted above, in some implementations, the 3D gesture detection assembly can be used to sense different parts of an object, such as a user's hand. In this example, changes in the profile of the hand can be detected and identified as a gesture by the gesture recognition component 508. For instance, a gesture can be a one-finger scrolling action made by the user as he repeatedly extends and bends his index finger. In this instance, an overall orientation of the hand may not be considered as changing over time, since the hand may be hovering in place over the 3D gesture detection assembly. However, the gesture recognition component 508 can detect changes to the profile of the hand (and/or the z-axis distance of the finger) as the orientation of the index finger changes. In this case, the gesture recognition component 508 can identify the change in profile as a scrolling gesture.

Additionally, as noted above, the use of multiple frequencies to excite the sensor cells 504 can help enable identification of more complex 3D gestures. For example, a frequency response from a sensor cell 504 excited with a signal at a single frequency of 6.6 GHz can be virtually the same for a hand at a distance of 5 mm as for a hand at another distance of 20 mm. However, if signals over a band of frequencies near 6.6 GHz are used to excite the sensor cell 504, the frequency responses for a hand at distances of 5 mm and 20 mm can be differentiated. The gesture recognition component 508 can identify gestures in part by the frequencies of signals sent to the sensor cells 504. Furthermore, in some implementations the gesture recognition component 508 can detect and differentiate multiple proximate objects at the same time.

In the example shown in FIG. 5, the sensor cell array 502 can include 32 sensor cells 504, which can produce 32 frequency responses for a given set of features (e.g., selected frequencies) that can be analyzed for signatures in the presence of an object. In some cases, to enable low overall power consumption, it can be desirable to excite the 32 sensor cells 504 separately. However, to enable real-time gesture recognition, it can be desirable to scan the frequency responses from the 32 sensor cells at multiple different frequencies faster than user 506 performs the gesture. Therefore, in order to complete a scan of the sensor cell array 502 across multiple frequencies in a relatively short time when only one sensor cell 504 is excited at a time, certain multiplexing strategies and/or machine learning techniques can be used.

In some implementations, it can be relatively faster to scan a single frequency across multiple sensor cells 504 than to reset the frequency before scanning each sensor cell 504. For this reason, many sensor cells 504 in the sensor cell array 502 can be sampled at a first frequency before changing to a second frequency. Additionally or alternatively, it may not be necessary to scan all frequencies. For example, feature selection techniques can be used to reduce the number of frequencies scanned. Example feature selection techniques are described relative to FIGS. 10 and 11.

In some implementations, once a scan of frequency responses of the sensor cell array 502 has been completed, a hosting device can use an inference algorithm to compute a position and distance of the hand of user 506. In the example shown in FIG. 5, the gesture recognition component 508 can compute a 2D position of the hand of user 506 in Instance 1, 2, and/or 3, relative to the x and y axes, from relative strengths of scalar power output values measured across the sensor cell array 502. Additionally, the gesture recognition component 508 can compute a distance of the hand from any individual sensor cell 504 from a magnitude of a scalar power output value at that individual sensor cell 504. Therefore, by monitoring changes in frequency responses from individual sensor cells 504 over time, the gesture recognition component 508 can track movement of the hand in three dimensions, and make a real-time identification of the movement as a 3D gesture.

System Examples

Figure 6:
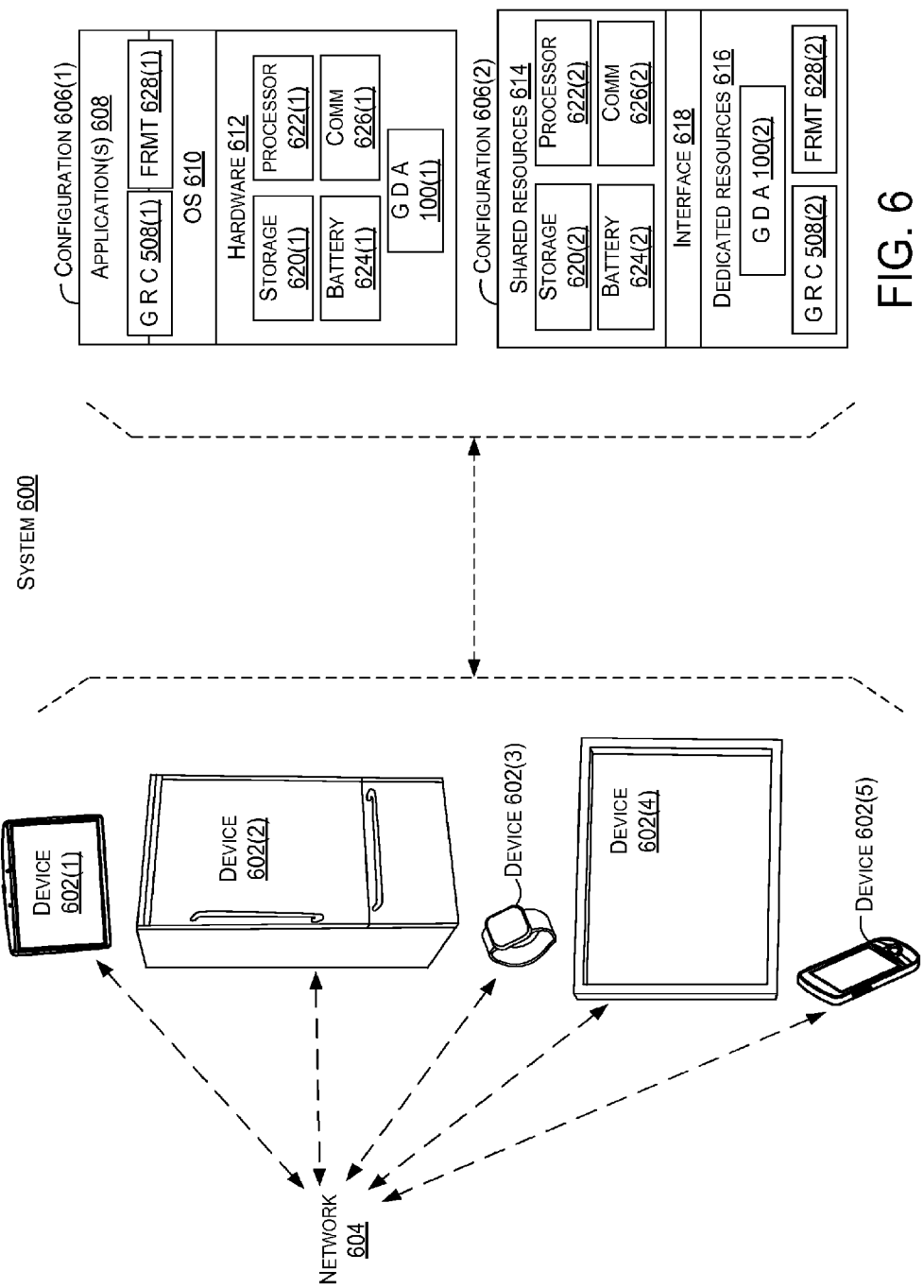
FIG. 6 illustrates an exemplary 3D gesture recognition system consistent with some implementations of the present concepts.
Figure 7:
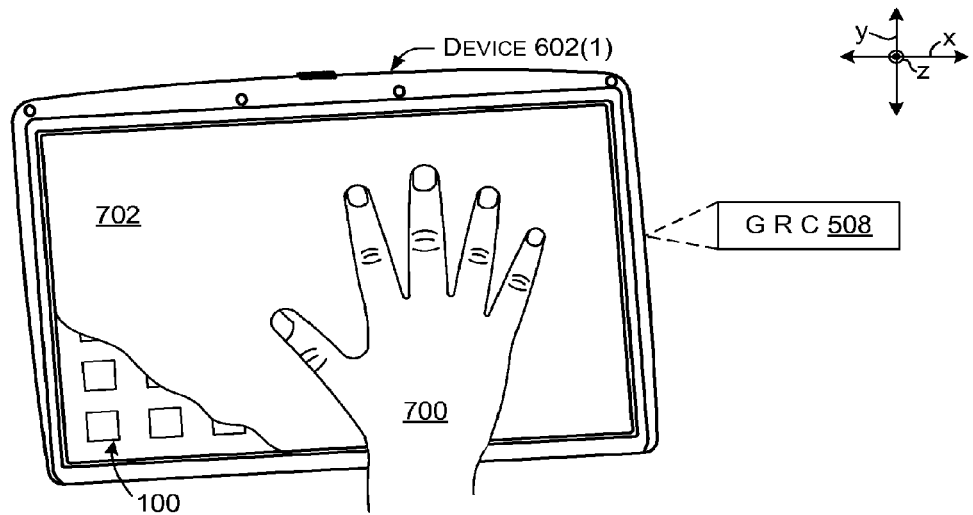
FIGS. 7-9 illustrate 3D gesture recognition system use scenarios consistent with some implementations of the present concepts.
Figure 8:
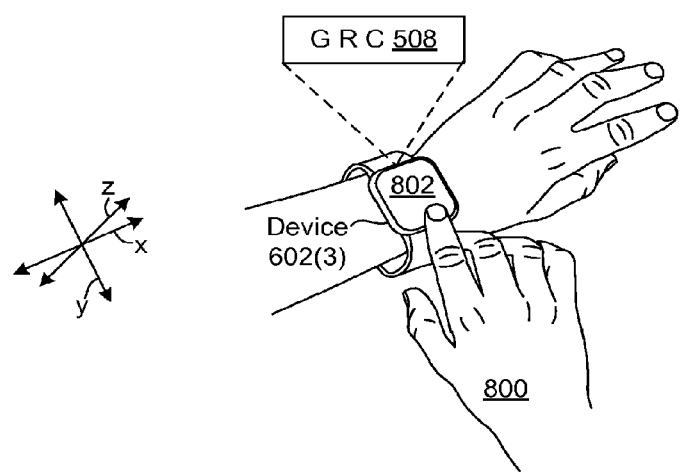
Figure 9:
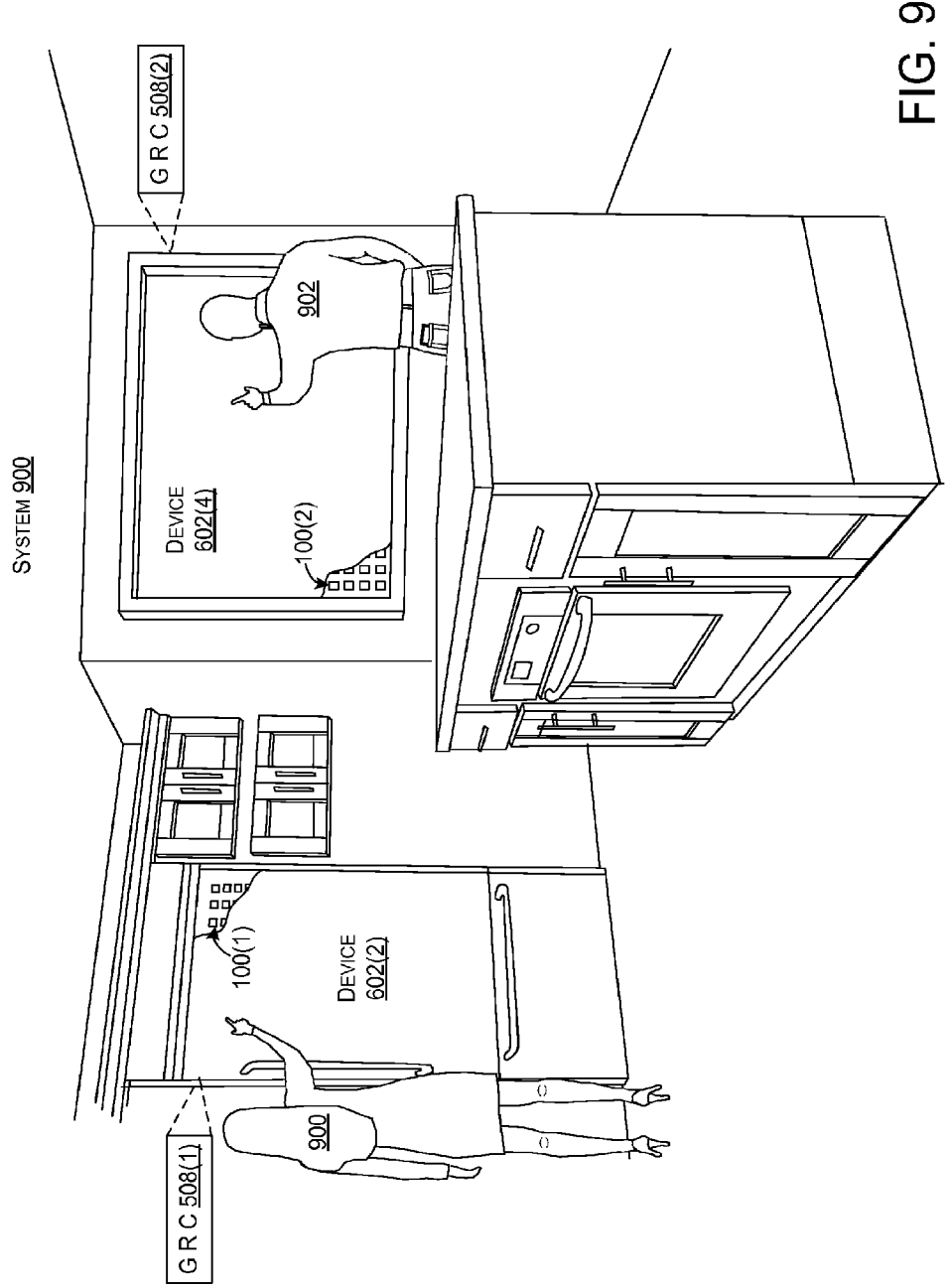

FIG. 6 shows an example 3D gesture recognition system 600 for accomplishing the present concepts. FIGS. 7 through 9 show example 3D gesture recognition device use scenarios consistent with the present concepts.

For purposes of explanation, FIG. 6 shows five example 3D gesture detection devices 602(1), 602(2), 602(3), 602(4), and 602(5). As shown in FIG. 6, device 602(1) can be a tablet type device, device 602(2) can be an appliance (e.g., a refrigerator), device 602(3) can be a smart personal and/or wearable device (e.g., a smart watch), device 602(4) can be a digital whiteboard (or other large display or screen), and device 602(5) can be a smart phone or other mobile device. The examples shown in FIG. 6 are not meant to be limiting, any of a wide variety of types of devices could be included in a gesture recognition system. As shown in FIG. 6, any of the devices 602 can communicate over one or more networks 604.

FIG. 6 shows two device configurations 606. Individual devices can employ either of configurations 606(1) or 606(2), or an alternate configuration. Briefly, configuration 606(1) represents an operating system centric configuration and configuration 606(2) represents a system on a chip (SOC) configuration. Configuration 606(1) is organized into one or more applications 608, operating system 610, and hardware 612. Configuration 606(2) is organized into shared resources 614, dedicated resources 616, and an interface 618 therebetween.

In either configuration 606, the 3D gesture detection device 602 can include storage 620, a processor 622, a battery 624 (or other power source), a communication component 626, and/or a frequency response mapping table (FRMT) 628. Either configuration 606 of device 602 can also include a gesture detection assembly (GDA) 100(1) or 100(2), such as the gesture detection assembly 100 described relative to FIG. 1. Either configuration 606 of device 602 can also include a gesture recognition component (GRC) 508(1) or 508(2), such as the gesture recognition component 508 described relative to FIG. 5.

In some implementations, the gesture recognition component 508 can receive input from the gesture detection assembly 100. For example, the gesture recognition component 508 can identify gestures from the output of a sensor cell array, as shown in the example in FIG. 5. In this example, the gesture recognition component can compare frequency responses included in the output of the sensor cell array using the frequency response mapping table 628. Briefly, the frequency response mapping table 628 can map frequency responses to known gestures. The gesture recognition component 508 can look for matches between output frequency responses from the sensor cell array and contents of the frequency response mapping table 628. Example techniques for generating the frequency response mapping table 628 are described relative to FIGS. 10 and 11.

In some cases, the frequency response mapping table 628 can be generated before a 3D gesture detection device 602 is used by a consumer. For instance, the frequency response mapping table 628 could be loaded onto the device at the time of manufacture of the 3D gesture detection device 602. In some cases, data can be added to the frequency response mapping table 628 later, such as when a user wishes to train a 3D gesture detection device 602 to identify a custom gesture(s) and/or calibrate his/her individual device.

The communication component 626 can allow the devices 602 to communication with various other devices. The communication component can include a receiver and a transmitter and/or other radio frequency circuitry for communicating via various technologies, such as cellular, Wi-Fi (IEEE 802.xx), Bluetooth, etc.

Note that in some cases the gesture recognition component 508 on device 602 can be relatively robust. In these cases the gesture recognition component 508 can perform analysis on signals received from the gesture detection assembly 100 to identify a user gesture. In other cases, the device 602 could send outputs and/or other information from the gesture detection assembly 100, the gesture recognition component 508, and/or the frequency response mapping table 628 to a remote resource, such as cloud based resources for processing. For instance, the cloud based resources could be used to analyze the information to identify a user gesture, to train the system to be able to identify a new gesture, and/or to add new information to the frequency response mapping table 628.

From one perspective, any of the 3D gesture detection devices 602 can be thought of as computers. The term "device," "computer," or "computing device" as used herein can mean any type of device that has some amount of processing capability and/or storage capability. Processing capability can be provided by one or more processors that can execute data in the form of computer-readable instructions to provide a functionality. Data, such as computer-readable instructions and/or user-related data, can be stored on storage, such as storage that can be internal or external to the computer. The storage can include any one or more of volatile or non-volatile memory, hard drives, flash storage devices, and/or optical storage devices (e.g., CDs, DVDs etc.), remote storage (e.g., cloud-based storage), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

As mentioned above, configuration 606(2) can be thought of as a system on a chip (SOC) type design. In such a case, functionality provided by the device can be integrated on a single SOC or multiple coupled SOCs. One or more processors can be configured to coordinate with shared resources, such as memory, storage, etc., and/or one or more dedicated resources, such as hardware blocks configured to perform certain specific functionality. Thus, the term "processor" as used herein can also refer to central processing units (CPUs), graphical processing units (GPUs), controllers, microcontrollers, processor cores, or other types of processing devices.

Generally, any of the functions described herein can be implemented using software, firmware, hardware (e.g., fixed-logic circuitry), manual processing, or a combination of these implementations. The term "component" as used herein generally represents software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media. The features and techniques of the component are platform-independent, meaning that they may be implemented on a variety of commercial computing platforms having a variety of processing configurations.

FIGS. 7 through 9 show example 3D gesture recognition device use scenarios consistent with the present concepts. FIG. 7 illustrates a user 700 with tablet type device 602(1). The tablet type device 602(1) can have a gesture detection assembly 100 (shown in a cut away view in FIG. 7) placed within or beneath a screen 702. In this example, the gesture detection assembly 100 can be used to detect proximity of a hand of user 700 to the screen 702 of the tablet device 602(1). The user 700 can move his hand in three dimensions in proximity to the screen 702, such as described above relative to the example in FIG. 5. In the example in FIG. 7, gesture recognition component 508 associated with tablet device 602(1) can identify the 3D movement of the hand as a 3D gesture(s). The gesture recognition component 508 can control the tablet device 602(1) in accordance with the gesture.

FIG. 8 illustrates a user 800 wearing smart watch device 602(3). In this example, the smart watch device 602(3) can have an embedded gesture detection assembly (such as gesture detection assembly 100 shown in the example in FIG. 7) that can be used to detect proximity of a finger of user 800 to a surface 802 of the smart watch device 602(3). In this scenario, gesture recognition component 508 can identify parameters of the finger as a 3D gesture(s). In some implementations, the gesture detection assembly in a gesture recognition device can detect proximity of a body part of a user through a material(s) that may be in between the device and the body part. In the example of the smart watch device 602(3), the user could be wearing a long-sleeve shirt. The sleeve could extend over the smart watch device 602(3) on the wrist of the user. In this example, the gesture detection assembly can detect the finger through the sleeve material.

FIG. 9 shows a first user 900 interacting with refrigerator device 602(2) and a second user 902 interacting with digital whiteboard device 602(4). In this case, a gesture detection assembly 100(1) can be embedded or otherwise associated with refrigerator device 602(2). Examples are provided above and below, where the gesture detection device 602 includes a display or screen. The gesture detection device can be employed in other scenarios. In the example of refrigerator device 602(2), the upper refrigerator door could be the gesture detection device 602 positioned behind a traditional panel (e.g. opaque surface). Alternatively, a sensor cell array could be embedded in a portion of the refrigerator door that also functions as a display. In still other implementations, gesture detection assemblies can be embedded or associated with another appliance, device, or other hardware in a person's home, office, etc.

FIG. 9 also shows user 902 interacting with digital whiteboard device 602(4). In this example, the digital whiteboard device 602(4) can be a relatively large display on a wall with an embedded gesture detection assembly 100(2). In the examples of devices 602(2) and 602(4) shown in FIG. 9, surface areas of embedded sensor cell arrays associated with screens (e.g., displays) of the devices can be relatively large. As such, these gesture recognition devices 602 can include gesture recognition components 508 that can detect and/or identify relatively large-scale gestures that can be performed with the arms, hands, and/or other body parts of the user. For instance, the gesture recognition components 508 may be able to detect 3D movement of both of a user's outstretched arms and identify the movement or other parameters as a two-arm user gesture, and control the devices 602 in accordance with the two-arm user gesture.

Method Examples

Figure 10:
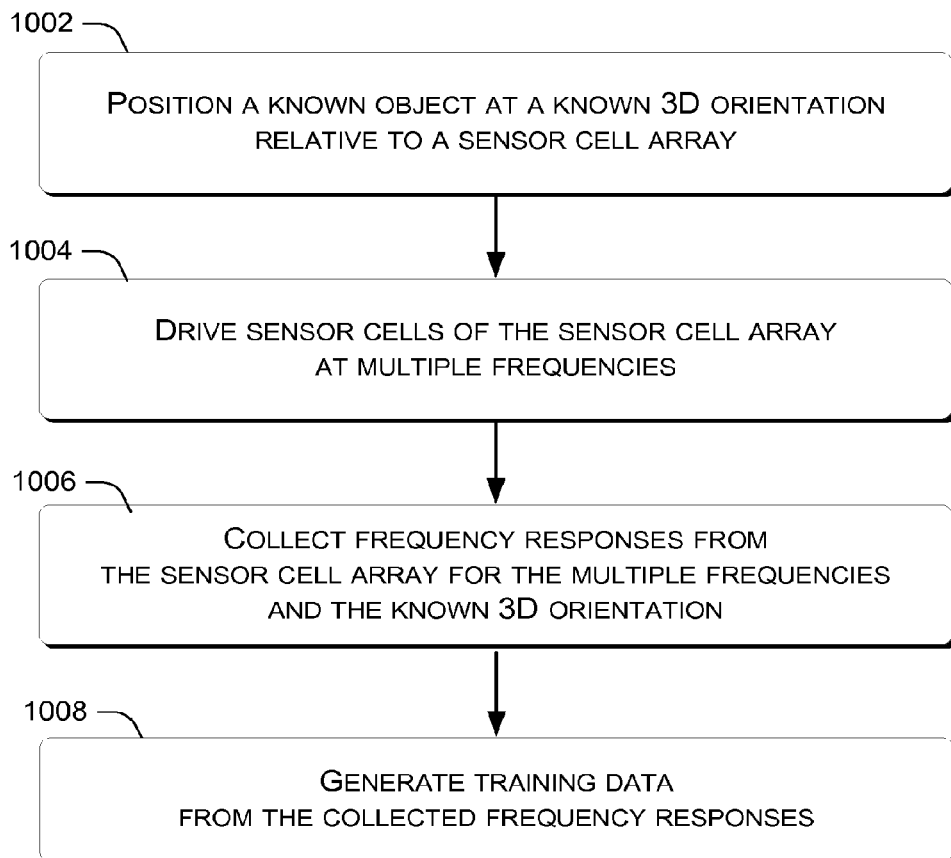
FIGS. 10-12 are flowcharts of example 3D gesture recognition techniques in accordance with some implementations of the present concepts.
Figure 11:
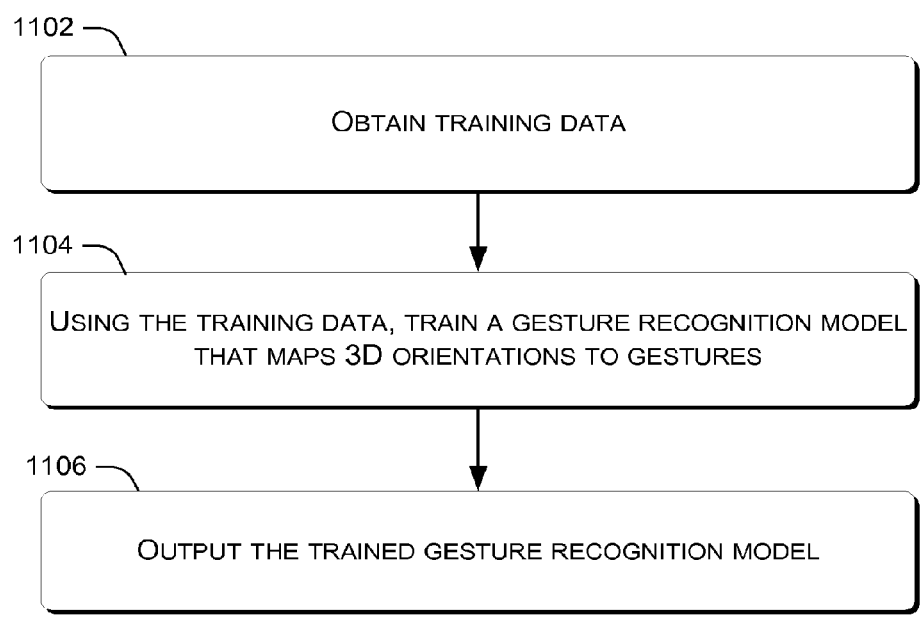
Figure 12:
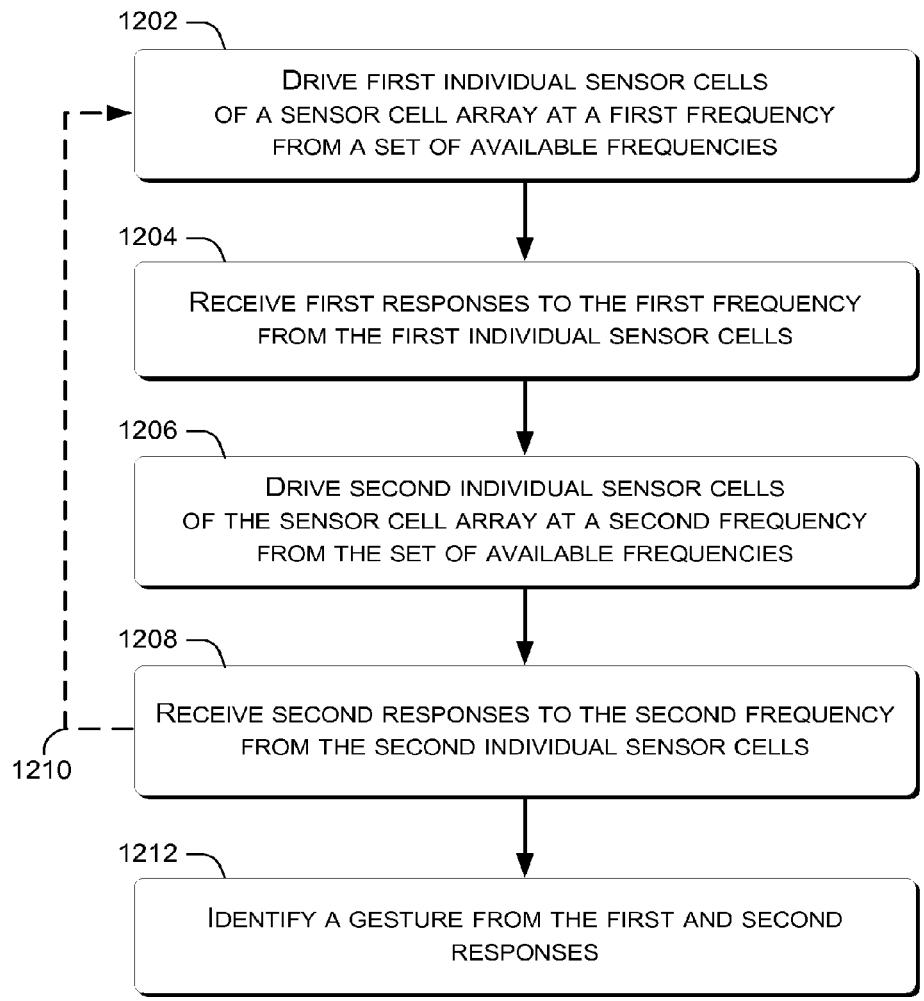

FIG. 10 shows an example method 1000 for generating training data for a gesture recognition system. FIG. 11 shows an example method 1100 for training a gesture recognition model for a gesture recognition system. FIG. 12 shows an example 3D gesture recognition method 1200.

Referring to FIG. 10, at block 1002, the method 1000 can position a known object at a known 3D orientation (e.g., position, distance) relative to a sensor cell array, such as sensor cell array 102 shown in FIG. 1. For instance, a user's hand can be positioned at a known distance (z dimension) and position (x and y axes) over the sensor cell array. See for example FIG. 5 which shows the user's hand at three different positions and a constant distance relative to the sensor cell array. One way to accomplish block 1002 can be to point RGBD cameras at the display while the user performs the gesture. The gesture can be "known" from the simultaneous output of the RGBD cameras and the sensor cell array.

At block 1004, the method 1000 can drive sensor cells of the sensor cell array at multiple frequencies while the object is at the known 3D orientation. In some cases the method can entail driving all desired sensor cells at a given frequency before changing to the next frequency. Additionally, for a given frequency one sensor cell can be driven at a time (e.g., the sensor cells can be driven sequentially at the given frequency).

At block 1006, the method 1000 can collect frequency responses from the sensor cell array for the multiple frequencies and the known 3D orientation. Blocks 1002-1006 can be repeated for another 3D orientation (e.g., the user's hand can be moved up or down or laterally and then the method can be repeated). Additionally, in some implementations, the frequency responses can be collected for multiple objects. For instance, the method can be repeated for multiple users to decrease bias associated with the test user (e.g., to be more representative of the population). For example, the training data might include frequency responses for multiple subjects, such as both men and women. Additionally, results can be improved by repeating the method multiple times at each set of conditions (e.g., user, 3D orientation, frequency) to reduce variability, such as temporal variability related to RF signals.

At block 1008, the method 1000 can generate training data from the collected frequency responses. In some implementations, the training data can include thousands of frequency responses that can be generated from different combinations of orientations, frequencies, objects, and times. In some cases the training data can include all of the frequency responses. In other cases the training data can include a subset of the frequency responses. For example, the training data can include frequency responses for a certain subset of the frequencies used to collect the frequency responses. For instance, some frequencies may be more influenced by the presence of an object at a given 3D orientation (e.g., more frequency response variance). Those highly influenced frequencies may be maintained in the training data while others are discarded.

In some cases, the training data can be manifest as a frequency response mapping table (discussed relative to FIG. 6). The frequency response mapping table can convey the known information (e.g., the object and the 3D orientation of the object) relative to the frequency responses. In other cases, the training data can be utilized to generate a gesture recognition model. This aspect is discussed below relative to method 1100.

To summarize, the example method 1000 shown in FIG. 10 can be utilized to develop training data. Generally, a known gesture can be performed proximate to a gesture detection assembly to produce training data. In some implementations, rather than sensing an entire gesture, the object can be sensed at known fixed locations. For instance, a technician's or user's hand can be sensed at a known distance at a first location, a second location, and a third location in a similar manner to FIG. 5. The process can be repeated at a second known distance and at a third known distance, etc. Modeling can be performed to 'fill in the gaps' between the known locations. For instance, in a factory setting, a technician can perform a specific gesture one or more times and frequency responses can be recorded for the gesture. In other cases, training gestures can be 'known' by recording the gestures with other sensors, such as 3D cameras while also sensing the gestures with the gesture detection assemblies. The training data can be frequency responses (e.g., measurements, power outputs) collected in response to the known gesture. The frequency responses can be collected relative to different combinations of position, distance, frequency, object, and/or time. In summary, the training data can provide two facets of information. The first facet relates to which frequencies tend to provide useful information. Since an almost infinite range of frequencies are available for sensing it may not be practical to sense all of the frequencies on a consumer device. Thus the training data can allow filtering to a subset of the useful frequencies. Second, the training data can provide the frequency responses (e.g., signatures) for the known gestures. This information can be utilized on a consumer device to identify gestures performed by the user.

In some implementations, the training data can be collected on a representative 3D gesture recognition device. In this case, training data collected from the representative 3D gesture recognition device can be used for training a gesture recognition model that can be used with multiple other 3D gesture recognition devices (described relative to FIG. 11). For instance, a representative device can be used to sense training data at a manufacturing facility. This training data can then be stored on all devices of the same model produced for the consumer market.

The example method 1100 shown in FIG. 11 can be used to train a gesture recognition model (e.g., machine learning model) to be able to identify a known gesture.

At block 1102, the method 1100 can obtain training data. In some implementations, the training data can be received from method 1000 described relative to FIG. 10.

At block 1104, the method 1100 can use the training data to train a gesture recognition model that maps 3D orientations to gestures. For example, a gesture recognition model can be trained to classify a 3D orientation of an object (e.g., a user's hand) relative to a gesture detection device. In some implementations, Random Forest Tree models can be trained using a WEKA machine learning toolkit. In one example with training data collected for multiple users, a "leave-one-user-out" type evaluation can be used in the training, where frequency responses from one user are left out as a test dataset while frequency responses from the remaining users are used as a training dataset. This process can be repeated, leaving frequency responses from a different one of the users out for individual evaluations, and averaging performance results from multiple evaluations at the end of the training. In some cases, Random Forest Tree models can be trained with 10 trees. Of course, other training techniques, such as Support Vector Machines, Neural Networks, or Hidden Markov Models can be used.

At block 1106, method 1100 can output the trained gesture recognition model.

In summary, in some implementations, the gesture recognition model can entail or utilize a frequency response mapping table of a 3D gesture recognition system, such as frequency response mapping table 628 of system 600 shown in FIG. 6. From one perspective the gesture recognition model can provide a basis that can allow extrapolation from the training data to detect unknown objects and/or 3D orientations (and potentially over time) to identify gestures. This aspect is discussed below relative to FIG. 12.

As noted above, the training data available for training a gesture recognition model can include thousands of frequency responses or measurements. In some implementations, training method 1100 can use a smaller amount of frequency responses (e.g., features) for training the gesture recognition model than are available. For example, the training method can train additional models with less of the available training data. In this example, the results of different models trained with different amounts of the training data can be compared to determine an amount of training data that can produce an acceptable position and/or distance result for gesture recognition. The results of this comparison can be used to lower an amount of sensor cell array scans that are utilized to identify a gesture.

In some implementations, the training method 1100 can be used to lower an amount of frequencies scanned with a sensor cell array in an end use scenario (e.g., by a consumer device that has constrained resources). Additionally or alternatively, the training method 1100 can be used to choose specific frequencies that are scanned with the sensor cell array. For example, the trained gesture recognition model could show that particular frequencies are more useful for determining position and/or distance of an object relative to a gesture recognition device than other frequencies. The particular frequencies could then be selected preferentially for scanning with the sensor cell array. In some implementations, the trained gesture recognition model can be used to lower an amount of sensor cell array scans that are used by a consumer to train a custom gesture on an individual gesture detection device.

FIG. 12 shows an example 3D gesture recognition method 1200. In this case, at block 1202 the method 1200 can drive first individual sensor cells of a sensor cell array at a first frequency from a set of available frequencies. In some implementations, the set of available frequencies can be selected based on output from a gesture recognition model, such as described relative to FIG. 11. Also as described relative to FIG. 11, the set of frequencies can be selected based on training data. Alternatively, in some implementations, a frequency or the set of frequencies can be preset (e.g., preselected). For example, a preset group of frequencies could be sent to the sensor cell array for scanning.

In some implementations, similar to the selection of the set of available frequencies, the first individual sensor cells can be selected based on output from a gesture recognition model, selected based on training data, and/or preset/preselected. The first frequency can be sent sequentially to the first individual sensor cells via a switching network. For example, the first frequency can be sent to a first, single individual sensor cell, then sent to a second, single individual sensor cell, etc. In this example, the power consumption of the system can be lower than if a signal were sent to multiple sensor cells at once.

At block 1204, method 1200 can receive first responses to the first frequency from the first individual sensor cells. In some implementations, the responses can be frequency shifts across individual sensor cells.

At block 1206 the method 1200 can drive second individual sensor cells of the sensor cell array at a second frequency from the set of available frequencies. In some cases, the first and second frequencies could be sent to all of the individual sensor cells. In other cases, the first and second frequencies could be sent to a same subset of individual sensor cells. In this case the first and second individual sensor cells can be the same individual sensor cells. In some implementations, the first and second frequencies can be sent to different subsets of individual sensor cells. For example, the first and second individual sensor cells may or may not overlap in terms of individual sensor cells.

At block 1208, method 1200 can receive second responses to the second frequency from the second individual sensor cells. Of course, additional responses can be collected for a variety of frequencies using a variety of sensor cells in the sensor cell array. For example, dashed line 1210 indicates that method 1200 can loop from block 1208 back to block 1202 for driving additional sensor cells with additional frequencies. For instance, while only two frequencies are expressly called out in blocks 1202-1208, these blocks can be repeated for tens or hundreds of frequencies.

At block 1212, method 1200 can identify a gesture from the first and second responses. In some implementations, identification of the gesture can include determining parameters of an object, such as a 3D orientation of the object relative to the sensor cell array. Furthermore, the 3D orientation (e.g., distance and position of the object) determined at multiple points in time, and/or other parameters, can be identified as a gesture. In some implementations, frequency responses can be compared to a trained gesture recognition model. For example, a gesture recognition component (such as gesture recognition component 508 described relative to FIGS. 5-9) can look up frequency responses for individual frequencies in a data table (such as frequency response mapping table 628 described relative to FIGS. 6 and 10) produced during training. Using the frequency response mapping table, the gesture recognition component can determine a corresponding position, distance, direction of travel, gesture, and/or other parameter of an object. Of course, although first and second responses are expressly described here for gesture identification, the gesture recognition component can use additional responses from additional frequencies to identify a gesture (as described above relative to dashed line 1210).

In some implementations, a gesture recognition component (508, FIG. 5) can utilize method 1200 and can learn to recognize a position, distance, gesture, and/or other parameter based on a calibration by a user and/or from corrections by a user. For example, a user can be prompted to calibrate a gesture recognition component when first using or setting up a gesture recognition device. In another example, if a user corrects an identification of a gesture made by a gesture recognition component, the gesture recognition component can learn to recognize the user's identification of the gesture. This aspect can also allow the user to create his/her own gestures. For instance, the user may be able to access a graphical user interface (GUI) via a 'settings' control that allows the user to perform his/her new gesture. The GUI may request that the user repeat the gesture multiple times, say 10 times, to increase accuracy. The gesture recognition component can capture the associated frequency response and then allow the user to tie the gesture to a command (e.g., this gesture means 'play video,' for instance). In some implementations, a user's calibration results and/or a user's identification of a gesture can be added to a frequency response mapping table.

Stated another way, the mapping table can include frequency responses stored on the device at the factory and/or obtained from the user. For instance, training can be performed on a device representative of a model of devices. The ensuing mapping table can then be stored on all the devices of that model at the factory, such as on memory or storage of the devices. The user may augment the mapping table by calibrating the individual device to the user (e.g., the calibrating can address slight differences in sensitivity of individual devices of a model and/or subtleties of how the individual user performs the gestures. Alternatively or additionally, the user can add customized gestures to the mapping table (e.g., the user can train custom gestures on the device and the gesture as defined by the user and the associated frequency responses can be added to the mapping table).

In some cases, gesture identification can be a relatively fixed process. In other cases, gesture identification can be an iterative process. For example, in method 1200, blocks 1202 and 1204 can be considered a first part of gesture identification, while blocks 1206 and 1208 can be considered a second part of gesture identification. For instance, gestures could be considered to have a first portion and a second portion. In some cases, a number of possible gestures could be reduced when a first portion of a gesture is recognized. In these cases, the trained gesture recognition model could show that given a first portion of a gesture, fewer frequencies or a lower number of sensor cells can be scanned to determine a second portion of the gesture. In light of the above discussion, referring back to the example in FIG. 5, a first portion of a gesture can be represented by Instances 1 and 2, while a second portion of the gesture can be represented by Instance 3. In this example, the first portion of the gesture can be recognized by the gesture recognition component 508 as the hand of user 506 in a position that activates individual sensor cell 504(1) at Instance 1, then activates individual sensor cell 504(2) and 504(3) at Instance 2. In some cases, the gesture recognition component 508 can use a trained gesture recognition model to determine that individual sensor cells 504 scanned subsequent to Instance 2 could include individual sensor cells near the last detected position of the user's hand. The gesture recognition component 508 can also use an apparent direction of movement of the hand from left to right (e.g., Instance 1 to Instance 2) to guide the determination of which sensor cells to scan next. For example, the gesture recognition component 508 could use the trained gesture recognition model and/or the left-to-right movement to determine that immediately subsequent to Instance 2, individual sensor cell 504(4) could be scanned, while individual sensor cell 504(1) might not be scanned.

The described methods can be performed by the systems and/or assemblies described above relative to FIGS. 1 through 9, and/or by other assemblies, devices, and/or systems. The order in which the methods are described is not intended to be construed as a limitation, and any number of the described acts can be combined in any order to implement the method, or an alternate method. Furthermore, the method can be implemented in any suitable hardware, software, firmware, or combination thereof, such that a device can implement the method. In one case, the method is stored on computer-readable storage media as a set of instructions such that execution by a computing device causes the computing device to perform the method.

CONCLUSION

An RF-based gesture recognition system can sense proximity of an object in three dimensions and use sensed information to identify a 3D gesture performed by the object. An RF-based approach to 3D gesture recognition that does not rely on touch sensors can enable more flexible and natural input and/or interaction with devices. Being RF-based, the present solutions include several distinct advantages over current sensing technologies which include the ability to work without relying on line of sight, the ability to be easily embedded behind any type of surface, and the ability to scale to almost any size, all while operating at a similar power domain to current proximity sensing technologies.

The RF-based gesture recognition system can include a gesture detection assembly that is robust to wear and tear, cheap to manufacture, low in profile, and can be made small for integration into mobile devices. In addition, interaction between an object and the gesture detection assembly can be unobstructed by dielectric materials in between, small in vertical sensing range in some cases, simple to scan the response, and have a high enough resolution to distinguish uniqueness. The RF-based gesture recognition system can also include a gesture recognition component for identifying complex gestures. The gesture recognition component can use a trained gesture recognition model and/or learn new gestures customized to a device or user.

Although techniques, methods, assemblies, devices, systems, etc., pertaining to device control are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, assemblies, devices, systems, etc.

The invention claimed is:
1. A system, comprising:
a gesture detection assembly including:
a sensor cell array, individual sensor cells of the sensor cell array comprising bandpass filters, and
a switching network having switches configured to route signals independently to selected sensor cells of the sensor cell array; and
a processor and storage storing computer readable instructions that, when executed by the processor, cause the processor to:
perform analysis of frequency responses received across the selected sensor cells, and,
detect an object proximate the sensor cell array from the analysis.
2. The system of claim 1, wherein an individual bandpass filter is configured to transmit an individual signal from an input port of a corresponding sensor cell to an output port of the corresponding sensor cell based at least on whether a frequency of the individual signal is within a certain band.
3. The system of claim 2, wherein the bandpass filters are two-port, half-wavelength coupled bandpass filters.
4. The system of claim 1, wherein the switching network is further configured to be able to route an individual signal to a single bandpass filter of the sensor cell array at a time.
5. A system, comprising:
a gesture detection assembly including:
a sensor cell array, individual sensor cells of the sensor cell array comprising bandpass filters and resonator patches, and
a switching network configured to send signals independently to the individual sensor cells of the sensor cell array; and a processor and storage storing computer readable instructions that, when executed by the processor, cause the processor to:

perform analysis of frequency responses received across the individual sensor cells, and, detect an object proximate the sensor cell array from the analysis.

6. The system of claim 5, wherein the bandpass filters are configured to couple energy to the resonator patches in response to the signals sent to the bandpass filters.

7. The system of claim 6, wherein the resonator patches are configured to create second bandpass responses in response to the coupled energy from the bandpass filters.

8. The system of claim 7, wherein the frequency responses include the second bandpass responses.

9. The system of claim 5, wherein the resonator patches produce an electromagnetic field in response to the signals.

10. The system of claim 9, wherein at least some of the frequency responses are related to disturbances of the electromagnetic field by the object.

11. A system, comprising:

a sensor cell array;

a switching network having switches configured to send signals independently to individual sensor cells of the sensor cell array; and a processor and storage storing computer readable instructions that, when executed by the processor, cause the processor to:

perform analysis of frequency responses of the individual sensor cells, and, detect an object proximate the sensor cell array from the analysis.

12. The system of claim 11, wherein at least one individual sensor cell of the sensor cell array is a terminated sensor cell.

13. The system of claim 12, wherein an individual frequency response received from the terminated sensor cell is a reflected signal.

14. The system of claim 11, wherein the switching network is configured to send an individual signal to at least one individual sensor cell and receive a corresponding frequency response from the at least one individual sensor cell via a single line.

15. The system of claim 14, wherein the corresponding frequency response is a reflected signal.

16. The system of claim 11, further comprising an additional sensor configured to sense the object, wherein the analysis includes consideration of results from the additional sensor.

17. The system of claim 16, wherein the additional sensor is a camera.

18. The system of claim 11, wherein the computer readable instructions further cause the processor to determine proximity of the object and another object to the sensor cell array based at least in part on the frequency responses.

19. The system of claim 11, wherein the computer readable instructions further cause the processor to differentiate the object and another object that is at a different distance from the sensor cell array based at least in part on the frequency responses.

20. The system of claim 11, wherein the switching network is further configured to sequentially send the signals to at least some of the individual sensor cells one at a time.

* * * * *